United States Patent
Eitelhuber et al.

(10) Patent No.: US 11,866,887 B2
(45) Date of Patent: Jan. 9, 2024

(54) TRACK-WHEEL BASED DEVICE

(71) Applicants: Georg Robert Eitelhuber, Thuwal (SA); Abdul Rahim Abdul Jaleel, Thuwal (SA)

(72) Inventors: Georg Robert Eitelhuber, Thuwal (SA); Abdul Rahim Abdul Jaleel, Thuwal (SA)

(73) Assignee: NOMADD DESERT SOLAR SOLUTIONS PTE. LTD.

( * ) Notice: Subject to any disclaimer, the term of this patent is extended or adjusted under 35 U.S.C. 154(b) by 342 days.

(21) Appl. No.: 17/172,130

(22) Filed: Feb. 10, 2021

(65) Prior Publication Data

US 2022/0250232 A1  Aug. 11, 2022

(51) Int. Cl.
| | |
|---|---|
| *E01B 25/22* | (2006.01) |
| *F24S 40/20* | (2018.01) |
| *E01B 25/24* | (2006.01) |
| *F24S 30/425* | (2018.01) |
| *B25J 9/00* | (2006.01) |
| *F24S 25/00* | (2018.01) |

(52) U.S. Cl.
CPC .............. *E01B 25/22* (2013.01); *E01B 25/24* (2013.01); *F24S 30/425* (2018.05); *F24S 40/20* (2018.05); *B25J 9/0015* (2013.01); *F24S 2025/019* (2018.05)

(58) Field of Classification Search
CPC .......... E01B 25/22; E01B 25/24; F24S 40/20; F24S 30/425; F24S 2025/019
USPC ........... 238/10 R; 105/99, 175.1, 177, 199.1, 105/218.2, 463.1, 96, 218.1–225; 104/307
See application file for complete search history.

(56) References Cited

U.S. PATENT DOCUMENTS

| | | | |
|---|---|---|---|
| 2013/0097790 A1* | 4/2013 | Liao | F24S 40/20 15/88.4 |
| 2013/0206173 A1* | 8/2013 | Zijlstra | B08B 3/024 134/6 |
| 2015/0244311 A1* | 8/2015 | Nakagawa | B08B 1/04 134/180 |
| 2017/0179873 A1* | 6/2017 | Eitelhuber | B08B 1/04 |

FOREIGN PATENT DOCUMENTS

| | | | | |
|---|---|---|---|---|
| DE | 202021102157 U1 | * | 6/2021 | ............. B08B 1/002 |
| ES | 2794248 A1 | * | 11/2020 | ................ B61F 7/00 |
| WO | WO2016071608 A | * | 5/2016 | |

* cited by examiner

*Primary Examiner* — Zachary L Kuhfuss
*Assistant Examiner* — James William Jones

(57) ABSTRACT

A track-wheel based device is disclosed. The track-wheel based device may include a longitudinal member substantially perpendicular to an axis of motion of the track-wheel based device. The track-wheel based device may further include a first lateral member and a second lateral member, each being substantially parallel to the axis of motion of the track-wheel based device. The longitudinal member may be coupled to the first lateral member at a first location of the first lateral member and to the second lateral member at a first location of the second lateral member. The first lateral member and the second lateral member may be configured to undergo a relative angular rotation, in response to a planar misalignment of four or more points of contact between two or more guide tracks for the track-wheel based device and the track-wheel based device.

28 Claims, 14 Drawing Sheets

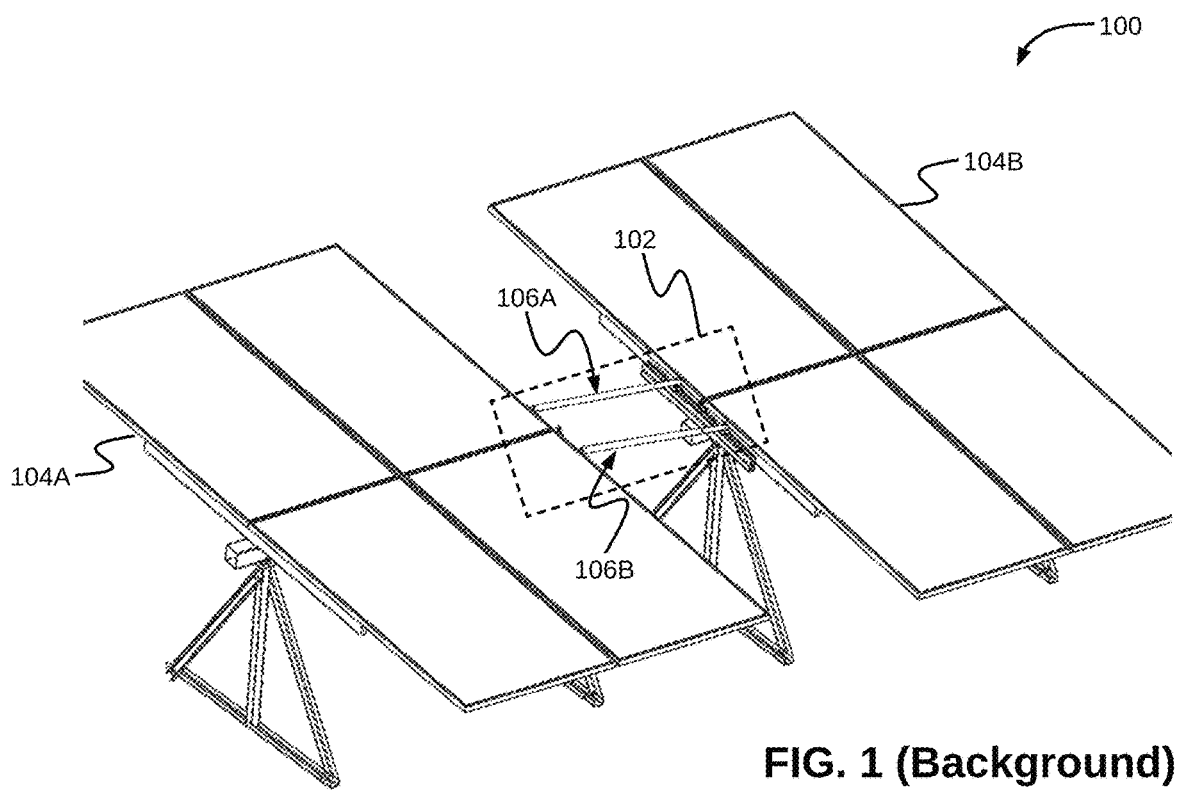
FIG. 1 (Background)
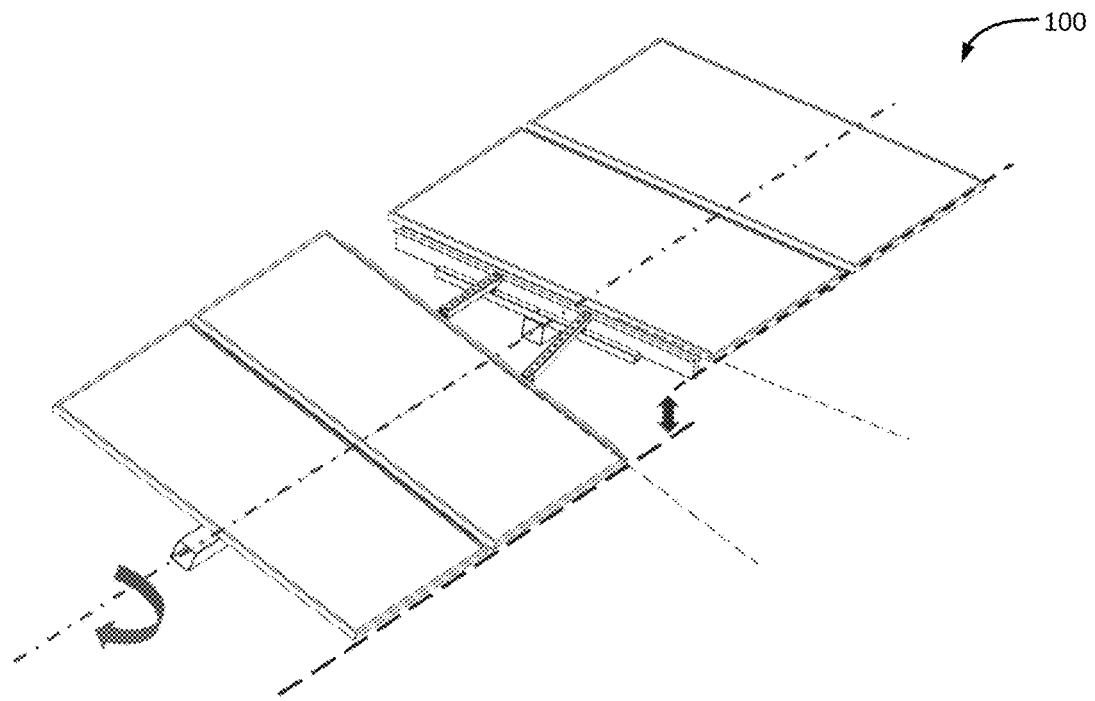
FIG. 1B (Background)

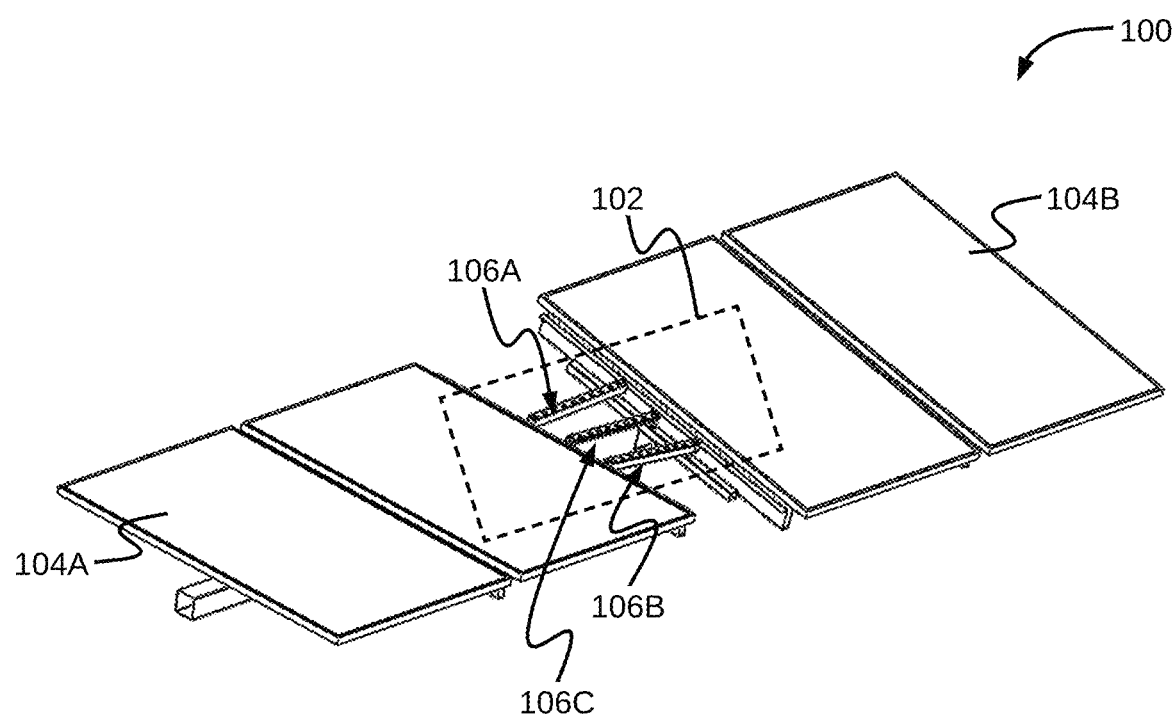
FIG. 1C (Background)
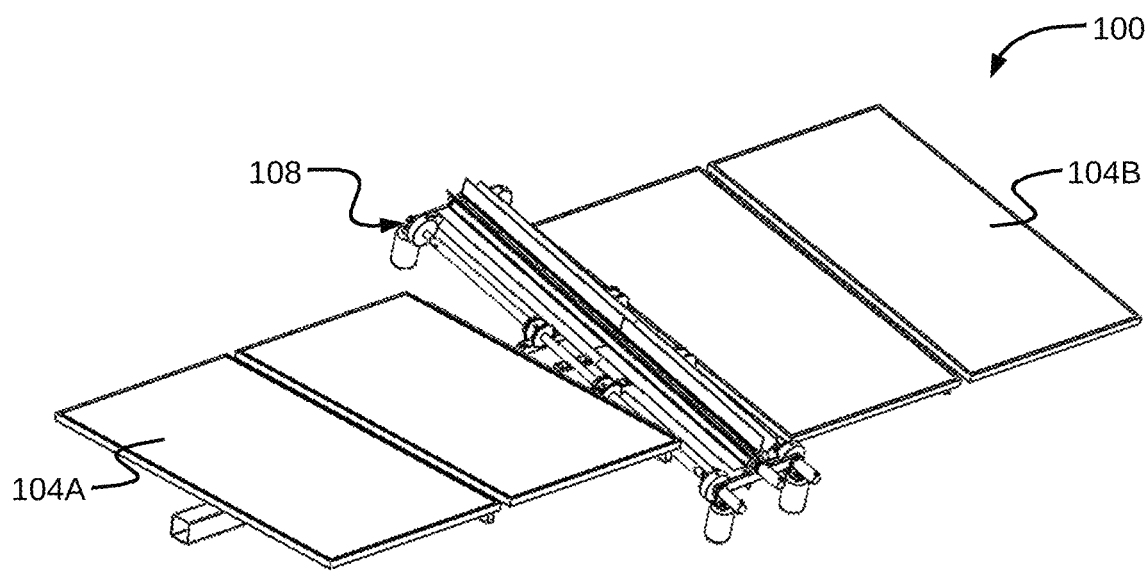
FIG. 1D (Background)

TRACK-WHEEL BASED DEVICE

TECHNICAL FIELD

This disclosure relates generally to a track-wheel based device, and particularly to a torsionally flexible track-wheel based device capable of travelling over misaligned guide tracks.

BACKGROUND

Track-wheel based devices configured to travel on one or more guide tracks may be useful in various applications areas. One such application area is inspection and cleaning of solar panels. For example, a set of solar panels are typically arranged in a plane to form a solar panel table that may be installed on a rooftop or a large open area. Further, for example, a solar array may include a large number of solar panel tables that are distributed over a large geographical area. However, such large area often has many topographical differences. The solar panel tables may be mounted on support understructures (e.g., fixed-tilt, or trackers types) that are fixed on the ground and that follow the ground contours. Although, it may be possible to step the contours using grading to reduce contour angles, however, this proves to be expensive.

Further, the solar panel tables are usually set up in long series lines, that may comprise of many solar panel tables in one long line. Due to panel length limitations and topographical differences, central axes of adjacent solar panel tables are often misaligned. The misalignment can occur in several different degrees of freedom between adjacent tables. For example, the misalignment may include a vertical and a laterally horizontal misalignment of longitudinal axes (seen end on). This may be caused when the end support poles of adjacent trackers do not line up, and may be around 300 millimeters (mm) vertically, and around 200 mm horizontally (laterally). Further, the misalignment may include misalignment due to topography angle (longitudinal axis) misalignment (seen side on). During normal operation, the misalignment may be around 15 degrees, but may increase beyond that as well. Furthermore, the misalignment may include tracker angle misalignment (seen end-on) which may be caused by internal torsional effects between the actuator and the ends of the panel. The actuator sensed angle may also have larger tolerances of a few degrees. The net effect may be up to 5 degrees tracker angle misalignment between adjacent solar panel tables.

It may be appreciated that the tracker system is a dynamic system, where the tracker angle changes over the day from up to +60 to −60 degrees of motion around the main axis, as it follows the sun. However, due to one or more of the above misalignments, complex compound angles may result between the panel planes (i.e., planes of solar panel tables). As a result, the panel frame outer corners at the top and bottom of adjacent solar panel tables may constantly change their relative distances and angular locations from each other.

The solar panels require regular cleaning, for example to remove dust, for efficient working of the solar panels. As such, the solar panels may be cleaned by a track-wheel based device (i.e., a robotic device) using brush assemblies. The cleaning may ideally occur in the early or late hours, when the tracker angle is large, to avoid humidity condensate. The cleaning may also occur at night, so as to avoid wind loading and vibrational effects from eddy currents, and panels are "stowed" at an angle between 0 and 25 degrees.

For robotic cleaning to be effective, multiple panels should be automatically cleaned with a dedicated track-wheel based device. This could be achieved very effectively, provided the track-wheel based device can navigate between adjacent solar panel tables effectively, for the maximum possible range of misalignments. However, due to the compound misalignment, this becomes hard to achieve.

In order to remove the compound angles, some techniques include performing cleaning only at zero tracker angle, by using one robotic device per tracker. However, this leads to requirement of a larger number of robotic devices, and therefore, higher cost. Some other techniques may use pinned and sliding bridges to create a smooth transition between panels. However, this results in a highly complex bridge design that requires a high amount of material and custom components, thereby increasing the cost.

A simple, low cost, and effective means of bridging the tracker tables (in other words, solar panels) of a solar array 100 may be achieved by a tracker bridge 102, as shown in FIG. 1 (Background). For example, the tracker bridge 102 may include guide tracks 106A, 106B bridging a first solar panel table 104A and the second solar panel table 104B to allow a seamless movement of the track-wheel based device (not shown in FIG. 1) between the first solar panel table 104A and the second solar panel table 104B. The guide tracks 106A, 106B may run from an associated first position on an inner side of the first solar panel table 104A facing the second solar panel table 104B to an associated second position on an inner side of the second solar panel table 104B facing the first solar panel table 102A. Further, the tracks 106A, 106B may also include an inner pipe partially disposed within an outer pipe, such that the inner pipe is configured to rotate within the outer pipe and is further configured to partially slide-in or slide-out of the outer pipe. A first coupler may mechanically couple the inner pipe with the first solar panel table 104A at the associated first position, and a second coupler configured to mechanically couple the outer pipe with the second solar panel table 104B at the associated second position. Further, as shown in FIG. 1A, when there is no compound misalignment between the adjacent solar panel tables 104A and 104B, the guide tracks 106A, 106B may be aligned to each other, i.e., parallel to each other.

However, due to the compound misalignment between the adjacent solar panel tables, the guide tracks 106A, 106B may be misaligned with respect to each other, as shown in FIG. 1B. In other words, the guide tracks 106A, 106B may assume convoluted alignment, as a result of which they may not lie in one plane.

FIG. 1C shows another solar array 100 with a tracker bridge 102 which includes three guide tracks 106A, 106B, 106C bridging the first solar panel table 104A and the second solar panel table 104B. Further, as shown in FIG. 1C, there is compound misalignment between the adjacent solar panel tables 104A and 104B, as a result of which the guide tracks 106A, 106B, 106C may assume convoluted alignment, due to which they may not lie in one plane. Further, as shown in FIG. 1D, a track-wheel based device 108 may be required to run on this tracker bridge 102, i.e., on the three guide tracks 106A, 106B, 106C in convoluted alignment, during transitioning from the first solar panel table 104A to the second solar panel table 104B.

In the scenarios of compound misalignment between the adjacent solar panel tables 104A and 104B, the track-wheel based device 108 may face a challenge in maintaining a contact with, and hence moving on the guide tracks 106A, 106B (or guide tracks 106A, 106B, 106C). For example, the track-wheel based device 108 may include multiple wheels, such that each of the multiple wheels may be configured to establish a point of contact with each of the guide tracks 106A, 106B, in order to move on the guide tracks 106A, 106B. However, due to misalignment/convoluted alignment of the guide tracks 106A, 106B, and due to rigidity of the track-wheel based device, the all the multiple wheels may fail to maintain a point of contact with the guide tracks 106A, 106B. As a result, the track-wheel based device 108 may face a risk of falling off the guide tracks 106A, 106B. Further, the transition of the track-wheel based device 108 from the guide tracks 106A, 106B to the solar panel table may not be smooth, and track-wheel based device 108 may even get stuck at the junction of the guide tracks 106A, 106B and the solar panel tables.

Therefore, a flexible track-wheel based device is desired that is able to overcome the misalignment/convoluted alignment of the guide tracks 106A, 106B, and is able to maintain a point of contact of the wheels with the guide tracks 106A, 106B, on the run.

SUMMARY

A track-wheel based device is disclosed, in accordance with an embodiment. In some embodiments, the track-wheel based device may include a longitudinal member substantially perpendicular to an axis (A1) of motion of the track-wheel based device. The track-wheel based device may include a first lateral member and a second lateral member. Each of the first lateral member and the second lateral member may be substantially parallel to the axis (A1) of motion of the track-wheel based device. The longitudinal member may be coupled to the first lateral member at a first location of the first lateral member, and to the second lateral member at a first location of the second lateral member. Further, the first lateral member and the second lateral member may be configured to undergo a relative angular rotation, in response to a planar misalignment of four or more points of contact between two or more guide tracks for the track-wheel based device and the track-wheel based device.

A track-wheel based device is disclosed, in accordance with another embodiment. The track-wheel based device may include a first lateral member and a second lateral member, each being substantially parallel to the axis (A1) of motion of the track-wheel based device. The track-wheel based device may further include a longitudinal member substantially perpendicular to an axis (A1) of motion of the track-wheel based device. The longitudinal member may be coupled to the first lateral member at a first location of the first lateral member and to the second lateral member at a first location of the second lateral member. The track-wheel based device may further include a secondary longitudinal member substantially perpendicular to an axis (A1) of motion of the track-wheel based device. The secondary longitudinal member may be coupled to the first lateral member at a second location of the first lateral member and to the second lateral member at a second location of the second lateral member. The track-wheel based device may further include an additional secondary longitudinal member substantially perpendicular to an axis (A1) of motion of the track-wheel based device. The additional secondary longitudinal member may be coupled to the first lateral member at a third location of the first lateral member and to the second lateral member at a third location of the second lateral member. The first lateral member and the second lateral member may be configured to undergo a relative angular rotation, in response to a planar misalignment of four or more points of contact between two or more guide tracks for the track-wheel based device and the track-wheel based device.

The accompanying drawings, which are incorporated in and constitute a part of this disclosure, illustrate exemplary embodiments and, together with the description, serve to explain the disclosed principles.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 1A-1C (Background) illustrate perspective views of a solar array, in accordance with an implementation of the prior art.

FIG. 1D (Background) illustrates a perspective view of a solar array with a track-wheel based robotic device, in accordance with an implementation of the prior art.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 2A:
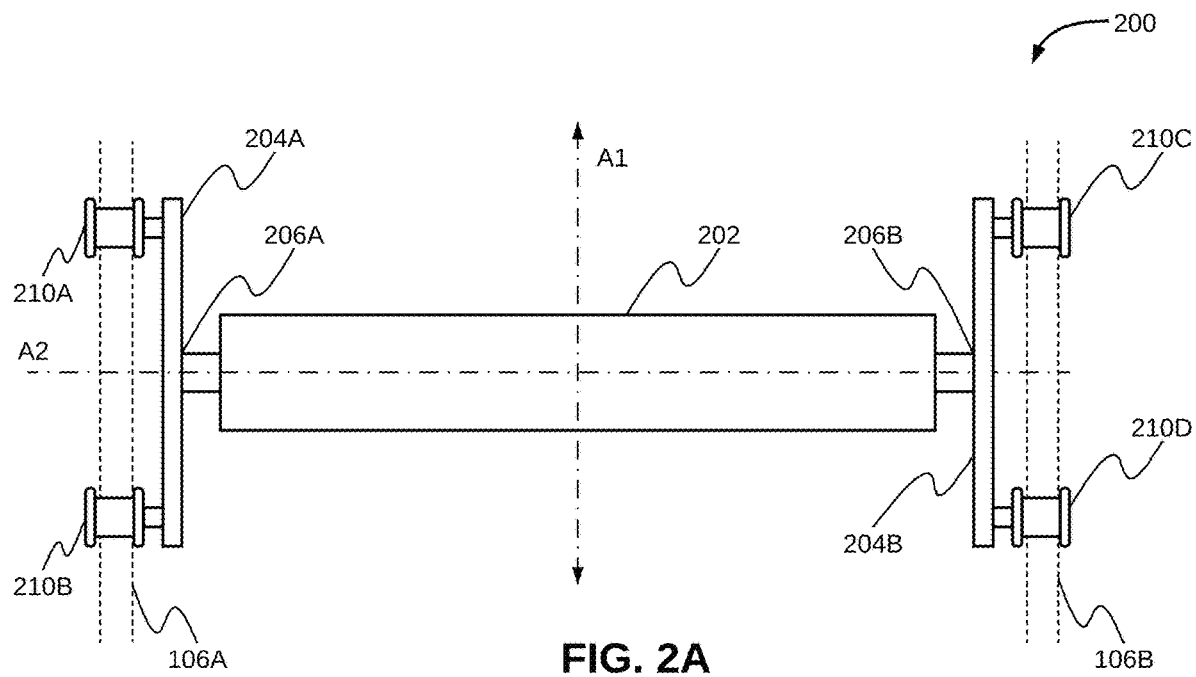
FIGS. 2A-2B illustrate top views of a track-wheel based device, in accordance with some embodiments of the present disclosure.
Figure 2B:
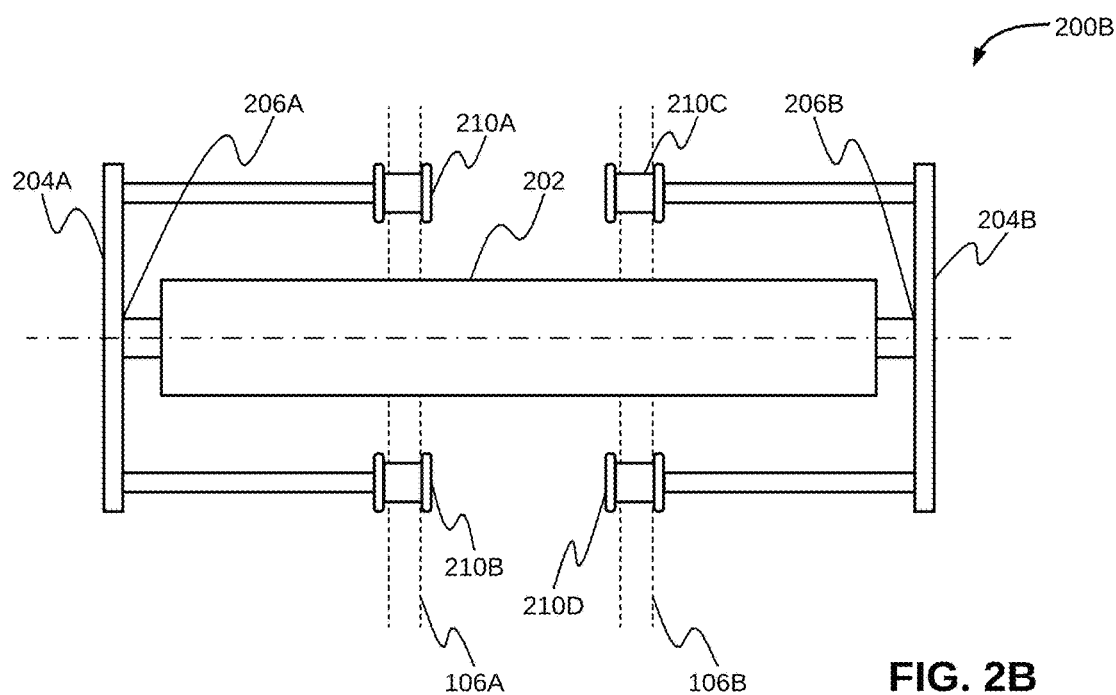

Referring now to FIG. 2A, a top view of a track-wheel based device 200 is illustrated, in accordance with an embodiment of the present disclosure. FIG. 2B illustrates a top view of a track-wheel based device 200B (a variant of the track-wheel based device 200), in accordance with another embodiment of the present disclosure. The track-wheel based devices 200, 200B may be configured to travel on a pair of guide tracks 106A, 106B. By way of an example, as mentioned earlier, the pair of guide tracks 106A, 106B may be part of a bridge connecting a first solar panel and a second solar panel.

In some embodiments, each of the track-wheel based devices 200, 200B may include a longitudinal member 202 which may be substantially perpendicular to an axis A1 of motion of the track-wheel based device 200. For example, the axis A1 of motion may be parallel to the length of the guide tracks 106A, 106B.

Each of the track-wheel based devices 200, 200B may further include a first lateral member 204A and a second lateral member 204B. Each of the first lateral member 204A and the second lateral member 204B may be substantially parallel to the axis A1. In other words, each of the first lateral member 204A and the second lateral member 204B may be aligned substantially perpendicular to the longitudinal member 202. The longitudinal member 202 may be coupled to the first lateral member 204A at a first location of the first lateral member 204A. Further, the longitudinal member 202 may be coupled to the second lateral member 204B at a first location of the second lateral member 204B. The first lateral member 204A and the second lateral member 204B may be configured to undergo a relative angular rotation, in response to a planar misalignment of four or more point of contacts between two or more guide tracks 106 for the track-wheel based device 200, 200B and the track-wheel based device 200, 200B.

It may be noted that the track-wheel based device 200, 200B may be configured to travel on the pair of guide tracks 106A, 106B by way of establishing multiple (in particular, four or more) points of contacts with the pair of guide tracks 106A, 106B. For example, in order to establish the multiple points of contacts, the track-wheel based device 200, 200B may include four or more wheels (the terms 'points of contact' and 'wheels' may have been interchangeably referenced with the reference numeral '210' in this disclosure). In some embodiments, as shown in FIG. 2A-2B, the track-wheel based device 200, 200B may include four wheels 210A, 210B, 210C, and 210D. For example, the track-wheel based device 200, 200B may include the first wheel 210A and the second wheel 210B fitted to the first lateral member 204A. The track-wheel based device 200, 200B may further include the third wheel 210C and the fourth wheel 210D fitted to the second lateral member 204B.

Further, in some embodiments, as shown in FIG. 2A (track-wheel based device 200), the first wheel 210A and the second wheel 210B (i.e., the wheels fitted to the first lateral member 204A) may be arranged in a manner to be facing away from the third wheel 210C and the fourth wheel 210D (i.e., the wheels fitted to the second lateral member 204B). As it will be understood, this arrangement allows the track-wheel based device 200 to travel on guide tracks 106A, 106B, when the guide tracks 106A, 106B are spaced apart by a long distance. It should be noted that in the original configuration of the track-wheel based device 200, the wheels 210A, 210B, 210C, and 210D may be in a planar alignment. As such, in the scenarios in which the pair of guide tracks 106A, 106B are in alignment, i.e., parallel to each other, the wheels 210A, 210B, 210C, and 210D may be able to establish four points of contact with the pair of guide tracks 106A, 106B.

Alternately or additionally, in some embodiments, as shown in FIG. 2B (track-wheel based device 200B), the first wheel 210A and the second wheel 210B (i.e., the wheels fitted to the first lateral member 204A) may be arranged in a manner to be facing towards the third wheel 210C and the fourth wheel 210D (i.e., the wheels fitted to the second lateral member 204B). Further, as it will be understood, this arrangement may allow the track-wheel based device 200B to travel on guide tracks 106A, 106B, when the guide tracks 106A, 106B are spaced apart by a short distance.

It may be noted that in some scenarios, due to the compound misalignment between the adjacent solar panel tables, the guide tracks 106A, 106B may be misaligned with respect to each other, i.e., the guide tracks 106A, 106B may assume convoluted alignment, as a result of which they may not lie in a single plane. As a result, in such scenarios, the four wheels 210A, 210B, 210C, and 210D may fail to establish four points of contacts with the guide tracks 106A, 106B, in the original configuration of the track-wheel based device 200. Such failure to establish four points of contacts with the pair of guide tracks 106A, 106B, may put the track-wheel based device 200, 200B under the risk of falling off the pair of guide tracks 106A, 106B. Further, such failure may disrupt smooth transition of the track-wheel based device 200, 200B from the guide tracks 106A, 106B to the solar panel table, or even worse cause the track-wheel based device 200 to get stuck at the junction of the guide tracks 106A, 106B and the solar panel tables.

Therefore, in response to such planar misalignment of four or more point of contacts between the guide tracks 106, the first lateral member 204A and the second lateral member 204B may undergo a relative angular rotation. In other words, the track-wheel based device 200, 200B may assume a twisted configuration from its original configuration. Upon the first lateral member 204A and the second lateral member 204B undergoing the relative angular rotation, i.e., the track-wheel based device 200, 200B assuming the twisted configuration, the four points of contacts may once again be established with the pair of guide tracks 106A, 106B.

In some embodiments, the first lateral member 204A and the second lateral member 204B may undergo the relative angular rotation about a torsional-axis A2 (as shown in FIG. 2A). This torsional-axis A2 may be perpendicular to the axis A1 of motion of the track-wheel based device 200.

In some embodiments, the longitudinal member 202 may be rigidly coupled to the first lateral member 204A and to the second lateral member 204B. For example, the longitudinal member 202 may be welded to the first lateral member 204A and to the second lateral member 204B. Alternately, the longitudinal member 202 may be fixed to the first lateral member 204A and to the second lateral member 204B using one or more fasteners, such as nut-bolts, rivets, etc. In such embodiments, in order for the first lateral member 204A and the second lateral member 204B to undergo the relative angular rotation, the longitudinal member 202 may be torsionally flexible. By way of an example, the longitudinal member 202 may be made of a material having high torsional flexibility.

Figure 2C:
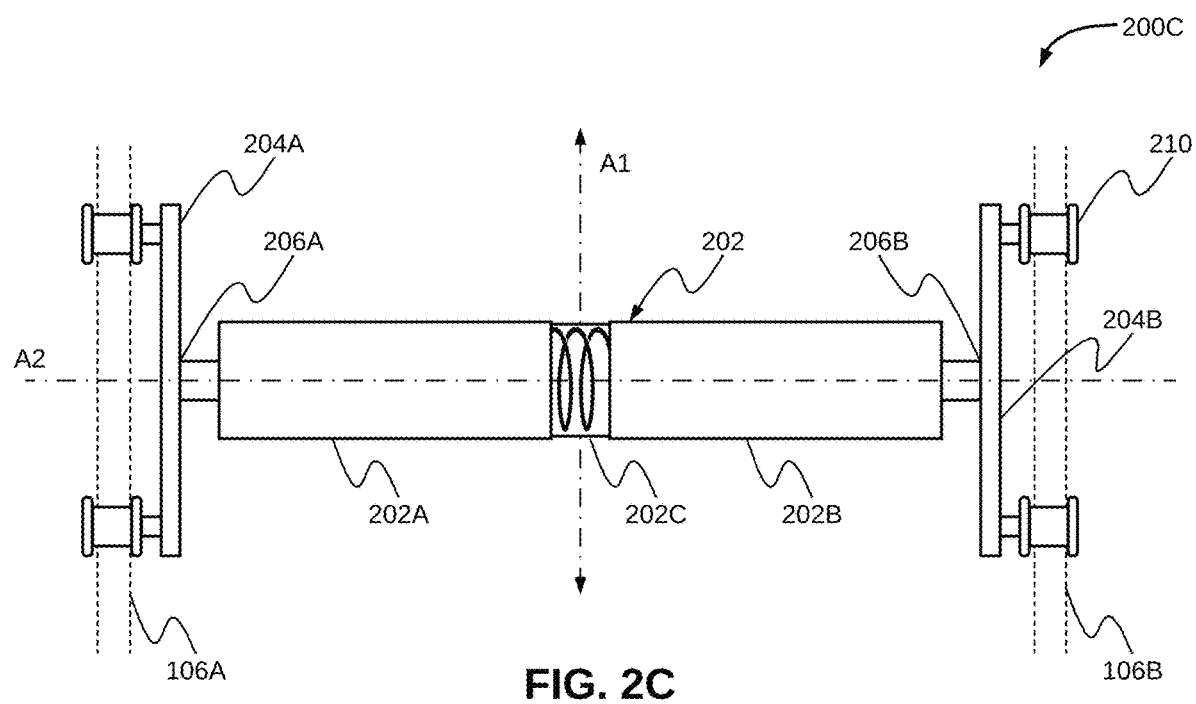
FIGS. 2C-2D illustrate top views of the track-wheel based device with a longitudinal member including a torsionally flexible member, in accordance with some embodiments of the present disclosure.
Figure 2D:
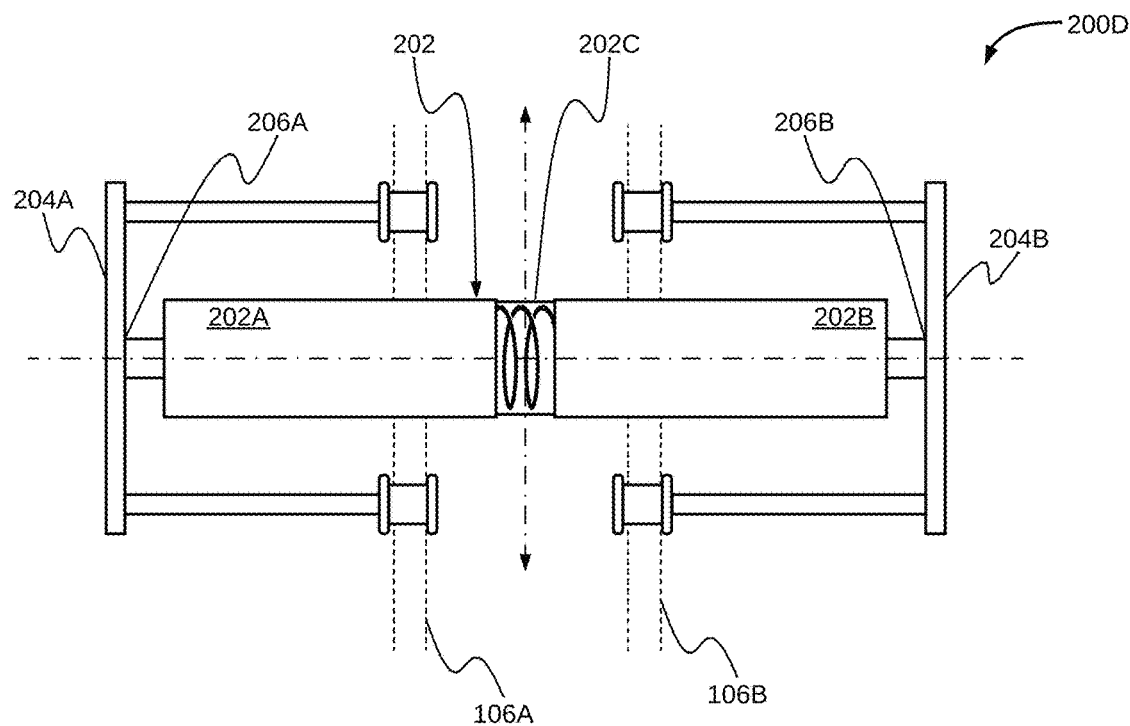

Referring now to FIGS. 2C-2D, top views of a track-wheel based device 200C and a track-wheel based device 200D (corresponding to the track-wheel based device 200) are shown, in accordance with some embodiments of the present disclosure. In some embodiments, as shown in FIGS. 2C-2D, the longitudinal member 202 may include a torsionally flexible member 202C. For example, the torsionally flexible member 202C may be a helical spring. As such, the longitudinal member 202 may include two sections, i.e., a first section 202A and a second section 202B with the torsionally flexible member 202C positioned between the first section 202A and a second section 202B. The torsionally flexible member 202C may be connected to first section 202A and a second section 202B, to thereby allow the first section 202A and the second section 202B to rotate/twist relative to each other. Therefore, by way of allowing the first section 202A to rotate/twist relative to the second section 202B, the torsionally flexible member 202C may make the longitudinal member 202 torsionally flexible. As a result, the first lateral member 204A and the second lateral member 204B may be able to undergo the relative angular rotation, as shown in FIG. 2E.

Figure 2E:
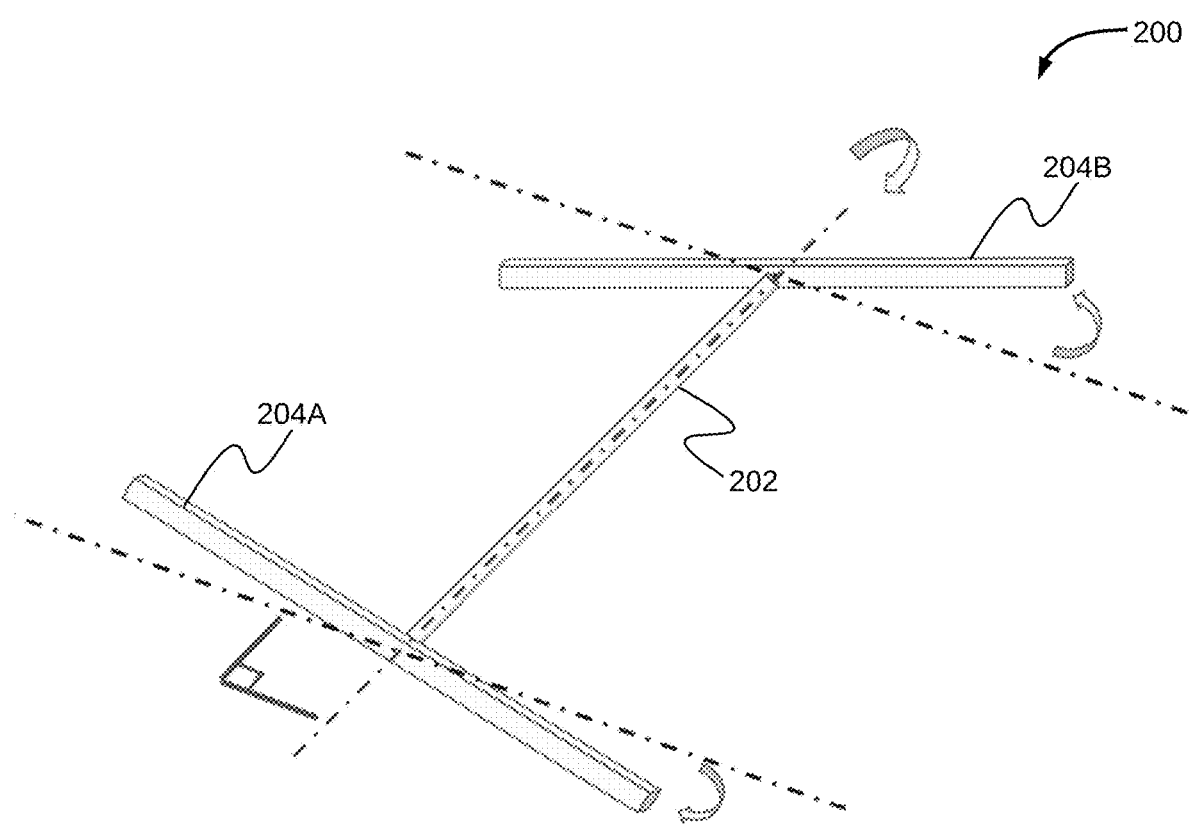
FIG. 2E illustrates a schematic perspective view of the track-wheel based device, in accordance with an embodiment.

Referring to the FIG. 2E, a schematic perspective view of the track-wheel based device 200 is illustrated, in accordance with an embodiment. As shown in the FIG. 2E, the track-wheel based device 200 is in the twisted configuration, with the first lateral member 204A and the second lateral member 204B having undergone a relative angular rotation (as indicated by the arrows). Further, as shown, the first lateral member 204A and the second lateral member 204B may be rigidly coupled to the longitudinal member 202. As such, in order for the first lateral member 204A and the second lateral member 204B to undergo the relative angular rotation, the longitudinal member 202 may be torsionally flexible, or the longitudinal member 202 may include a torsionally flexible member 202C, as already explained above.

As it will be appreciated, it may be desirable to control the relative angular rotation between the first lateral member 204A and the second lateral member 204B, i.e., control the twisting of the track-wheel based device 200. For example, after the track-wheel based device 200 has assumed the twisted configuration (during travelling on guide tracks 106A, 106B when the guide tracks 106A, 106B are in convoluted misalignment), a restoring force may be required to restore the track-wheel based device 200 to its original or untwisted configuration. This may cause to once again bring the four points of contacts in planar alignment when the track-wheel based device 200 is no longer travelling on the guide tracks 106A, 106B in convoluted misalignment.

As such, in the above embodiments (i.e., the longitudinal member 202 being torsionally flexible or the longitudinal member 202 including a torsionally flexible member 202C), the longitudinal member may have sufficient elasticity to apply the restoring force to thereby to control the relative angular rotation between the first lateral member 204A and the second lateral member 204B.

Figure 2F:
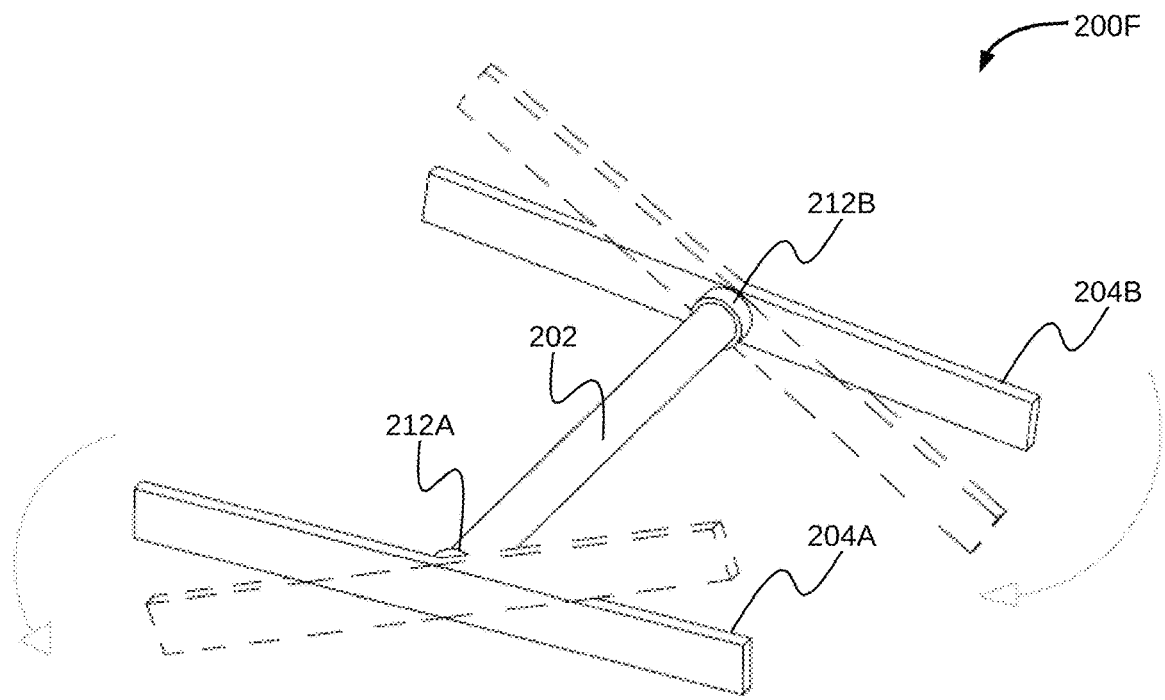
FIG. 2F illustrates a perspective view of the track-wheel based device with the longitudinal member coupled to a first lateral member and a second lateral member via couplers (bearings), in accordance with an embodiment.

In some embodiments, in order for the first lateral member 204A and the second lateral member 204B to undergo the relative angular rotation, the longitudinal member 202 may be coupled to the first lateral member 204A via a first coupler 206A and to the second lateral member 204B via a second coupler 206B. It may be noted that at least one of the first coupler 206A and the second coupler 206B may be configured to allow a rotational movement of the longitudinal member 202 relative to one of the first lateral member 204A and the second lateral member 204B. In other words, the longitudinal member 202 may not be rigidly coupled to the first lateral member 204A and to the second lateral member 204B. Instead, the longitudinal member 202 may be allowed to rotate with respect to the first lateral member 204A and/or to the second lateral member 204B. To this end, the longitudinal member 202 may be coupled to each of the first lateral member 204A and to the second lateral member 204B via a bearing. For example, the bearing may be a roller bearing, Referring now to FIG. 2F, a perspective view of a track-wheel based device 200F (corresponding to the track-wheel based device 200) is illustrated, in accordance with an embodiment of the disclosure. As shown in the FIG. 2F, the longitudinal member 202 may be coupled to the first lateral member 204A via a first bearing 212A, and to the second lateral member 204B via a second bearing 212B. in other words, the first coupler 206A may include the first bearing 212A, and the second coupler 206B may include the second bearing 212B. Therefore, by way of the bearings, the first lateral member 204A and the second lateral member 204B may undergo the relative angular rotation (as indicated by the dotted first lateral member 204A and the second lateral member 204B).

Further, in such embodiments, in order to control the relative angular rotation between the first lateral member 204A and the second lateral member 204B, track-wheel based device 200 may further include at least one torsional spring. This is further explained in conjunction with FIG. 2G.

Figure 2G:
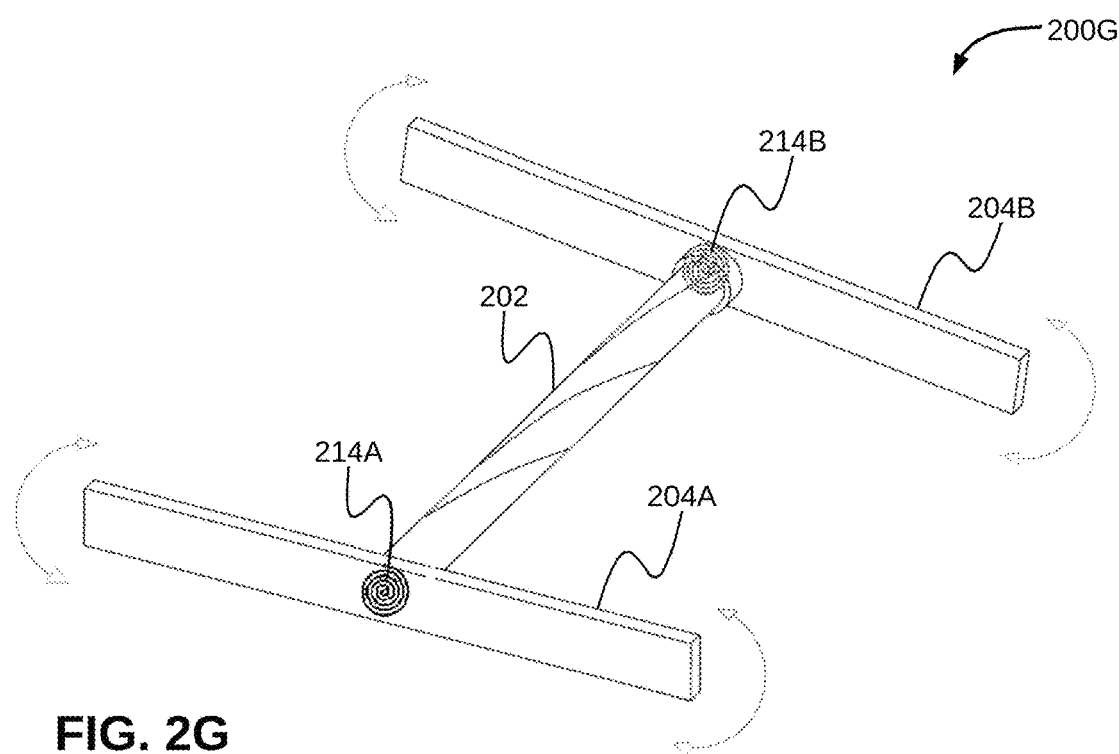
FIG. 2G illustrates a perspective view of the track-wheel based device with the longitudinal member coupled to the first lateral member and the second lateral member via torsional springs, in accordance with an embodiment.

Referring now to FIG. 2G, a perspective view of the track-wheel based device 200G is illustrated, in accordance with an embodiment of the disclosure. As shown in the FIG. 2G, in some embodiments, the first coupler 206A and/or the second coupler 206B may include a torsional spring. For example, the first coupler 206A may include a first torsional spring 214A. Additionally or alternately, the second coupler 206B may include a second torsional spring 214B. In other words, the longitudinal member 202 may be coupled to the first lateral member 204A via the first torsional spring 214A. Further, the longitudinal member 202 may be coupled to the second lateral member 204B via the second torsional spring 214B. As it will be understood, the first torsional spring 214A and the second torsional spring 214N may apply spring force against the relative angular rotation between the first lateral member 204A and the second lateral member 204B, to thereby control the relative angular rotation. As it will be understood, in the above embodiments, the first lateral member 204A and the second lateral member 204B may undergo a passive relative angular rotation, the relative angular rotation resulting in response to a planar misalignment of the four points of contact between the guide tracks 106A, 106B.

In some embodiments, in order for the first lateral member 204A and the second lateral member 204B to undergo the relative angular rotation, the track-wheel based device 200 may include at least one rotational actuator (not shown in FIGS. 2A-2F). This rotational actuator may be configured to cause the relative angular rotation. In other words, the rotational actuator may cause an active relative angular rotation. For example, the rotational actuator may include an electric motor, a servo motor, and the like. As it will be understood, the at least one rotational actuator may apply active force to cause the relative angular rotation. Further, the at least one rotational actuator may detect a planar misalignment of the four points of contacts between the guide tracks 106A, 106B and the track-wheel based device 200. To this end, the track-wheel based device 200 may include one or more sensors. By way of an example, the one or more sensors may detect the convoluted misalignment of the guide tracks 106A, 106B. By way of another example, the one or more sensors may detect the failure to establish four points of contacts of the wheels with the guide tracks 106A, 106B. Upon detecting, the at least one rotational actuator may cause the relative angular rotation between the first lateral member 204A and the second lateral member 204B to re-establish the four points of contact of the wheels 201 with the guide tracks 106A, 106B. It may be further understood that once the convoluted misalignment of the guide tracks 106A, 106B is reduced or eliminated, the at least one rotational actuator may cause reverse relative angular rotation between the first lateral member 204A and the second lateral member 204B to restore the original or untwisted configuration of the track-wheel based device 200.

Figure 2I:
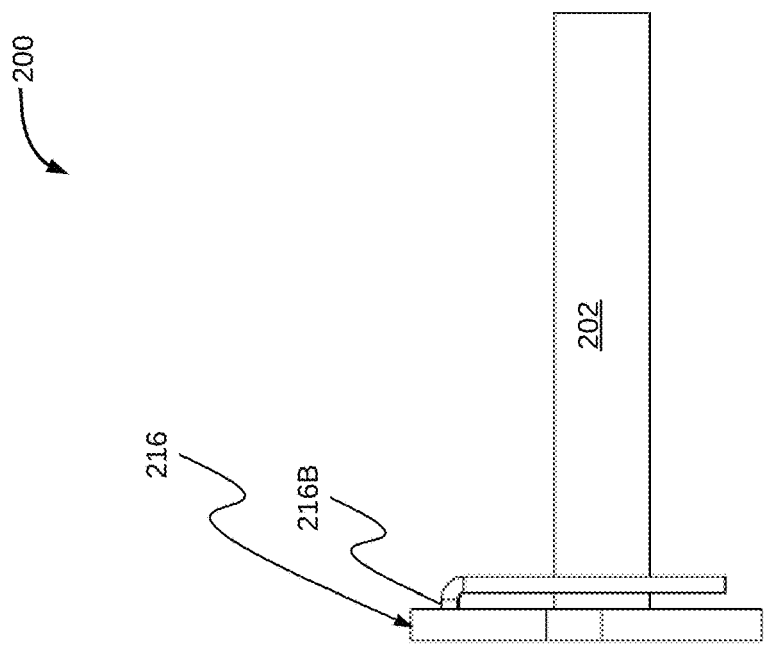
FIGS. 2H-2I illustrate a side view and a front view, respectively, of the track-wheel based device with a rotation limiter, in accordance with an embodiment of the disclosure.
Figure 2H:
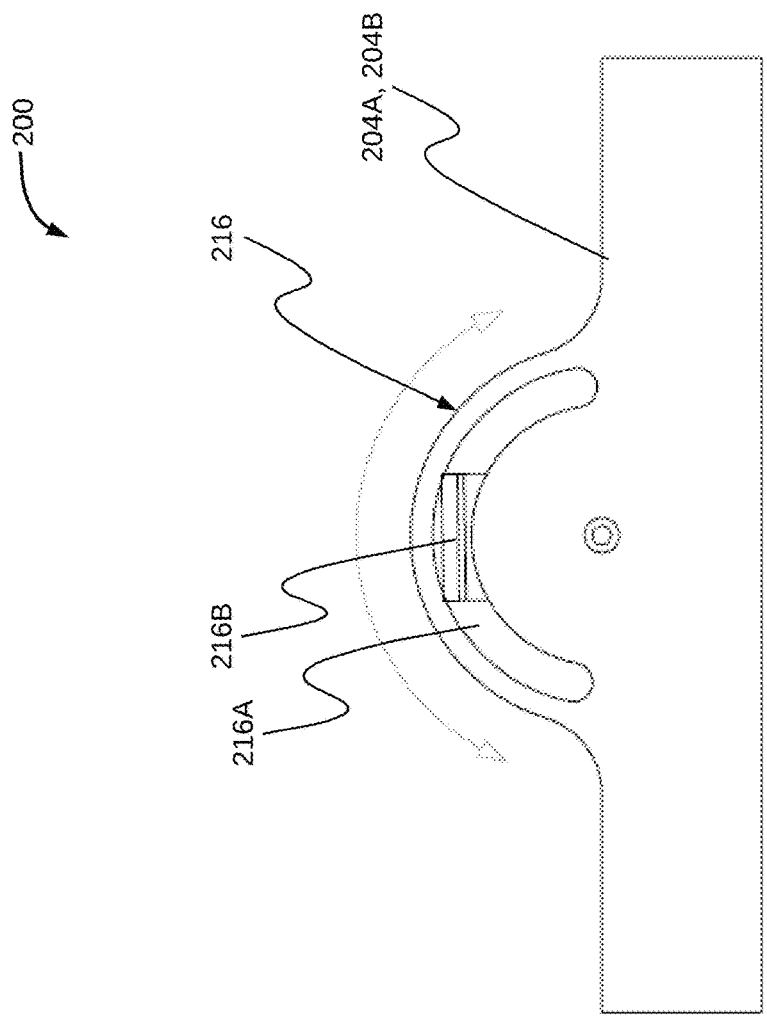

In some embodiments, the track-wheel based device 200 may further include at least one rotation limiter to limit the relative angular rotation. Referring to FIGS. 2H-2I, a side view and a front view, respectively, of the track-wheel based device 200 are illustrated, in accordance with an embodiment of the disclosure. As shown in the FIGS. 2H-2I, in some embodiments, the track-wheel based device 200 may further include at least one rotation limiter 216 to limit the relative angular rotation. As mentioned earlier, the longitudinal member 202 may be coupled to the first lateral member 204A via the first coupler 206A and to the second lateral member 204B via the second coupler 206B. At least one of the first coupler 206A and the second coupler 206B may include the rotation limiter 216.

For example, the rotation limiter 216 may include a groove member having a groove 216A fixed to the first lateral member 204A and/or the second lateral member 204B. The rotation limiter 216 may further include a spike 216B fixed to the longitudinal member 202, such that the spike 216B may be configured to pass through the groove 216A. Therefore, as the longitudinal member 202 rotates, the spike 216B may travel along the path defined by the groove 216A. However, the travel of the longitudinal member 202 may be limited by the extreme ends of the groove 216A. As such, the rotation limiter 216 may limit the relative angular rotation within the extreme ends of the groove 216A.

Figure 3A:
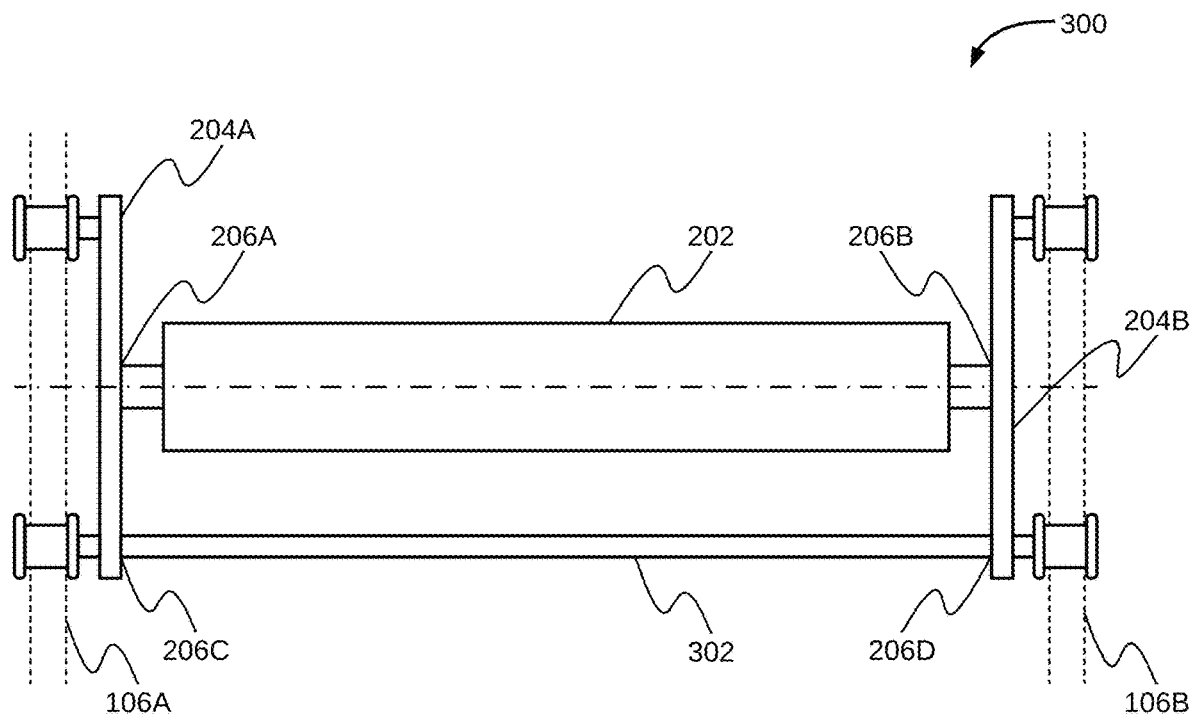
FIG. 3A illustrates a top view of the track-wheel based device including a secondary longitudinal member, in accordance with an embodiment of the disclosure.

Referring now to FIG. 3A, a top view of a track-wheel based device 300 (corresponding to the track-wheel based device 200) is illustrated, in accordance with an embodiment of the disclosure. As shown in the FIG. 3A, in some embodiments, the track-wheel based device 300 may include a secondary longitudinal member 302. This secondary longitudinal member 302 may be coupled to the first lateral member 204A at a second location of the first lateral member 204A and to the second lateral member 204B at a second location of the second lateral member 204B.

In some embodiments, the secondary longitudinal member 302 may be configured to undergo a change in length in response to the relative angular rotation between the first lateral member 204A and the second lateral member 204B. For example, in some embodiments, the secondary longitudinal member 302 may be rigidly coupled to the first lateral member 204A and the second lateral member 204B. In such embodiments, therefore, the secondary longitudinal member 302 should be able to expand or contract in length, to allow the relative angular rotation between the first lateral member 204A and the second lateral member 204B, to thereby allow the track-wheel based device 300 to assume the twisted configuration. Further, the secondary longitudinal member 302 should be able to rotate to some degrees relative to the first lateral member 204A and the second lateral member 204B, in response to the relative angular rotation between the first lateral member 204A and the second lateral member 204B. In other words, the secondary longitudinal member 302 may have tension and torsional flexibility. As such, the secondary longitudinal member 302 may be made of material having sufficient elasticity to allow the change in the length and the rotation/twist. For example, the secondary longitudinal member 302 may be made of material selected from rubber, steel, etc. In another example, the secondary longitudinal member 302 may be a spring, for example, a helical spring.

It may be noted that, in some embodiments, the secondary longitudinal member 302 may have torsional resistance property, to control the relative angular rotation. For example, the secondary longitudinal member 302 may be made of a material having a sufficiently high elasticity to provide the torsional resistance property. For example, such material may be selected from rubber, steel, etc. In some embodiments, the secondary longitudinal member 302 may be a tension spring, such as a helical spring. In other words, the entire length of the secondary longitudinal member 302 may be a helical spring. One end of this tension spring may be connected to the first lateral member 204A, and the other end of this tension spring may be connected to the second lateral member 204B.

Figure 3B:
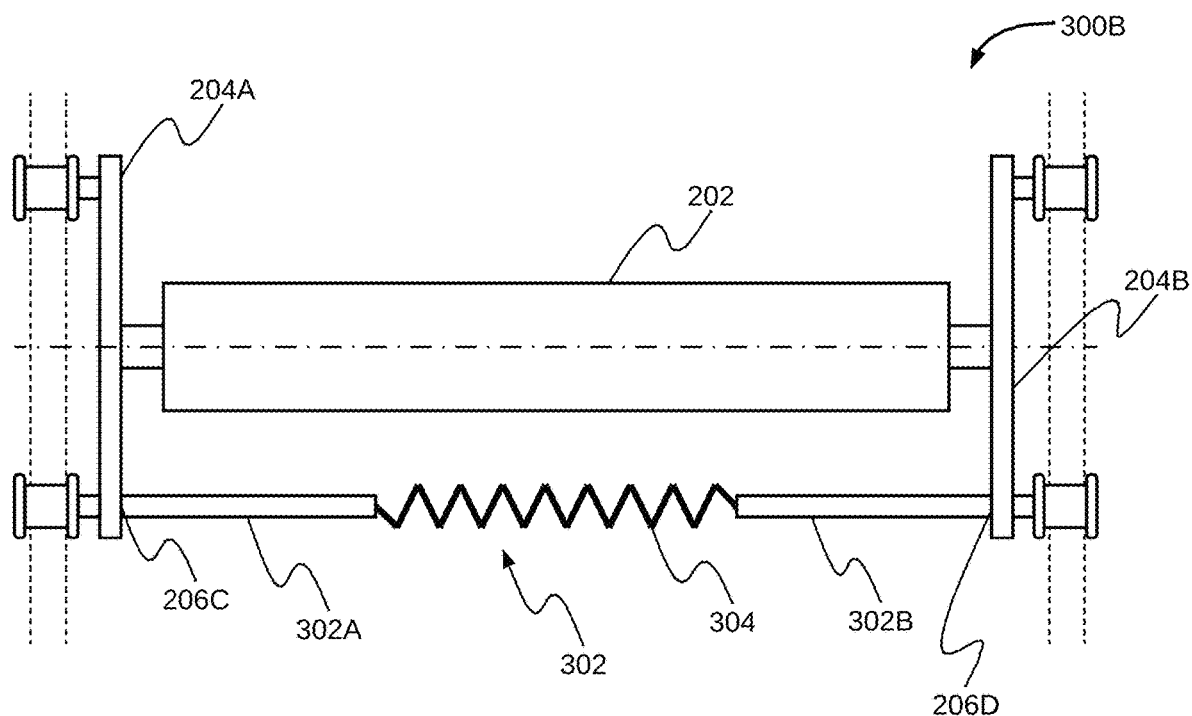
FIG. 3B illustrates a top view of the track-wheel based device including the secondary longitudinal member and a tension spring, in accordance with an embodiment of the disclosure.

FIG. 3B shows a top view of a track-wheel based device 300B (corresponding to the track-wheel based device 200), in accordance with an embodiment of the present disclosure. In alternate embodiments, as shown in FIG. 3B, the secondary longitudinal member 302 may include a tension spring 304 having tension and torsional flexibility. Further, the tension spring 304 may be able to control the relative angular rotation. For example, the tension spring 304 may be a helical spring. As shown in FIG. 3B, the secondary longitudinal member 302 may include two sections, i.e., a first section 302A and a second section 302B with the tension spring 304 positioned between the first section 302A and the second section 302B. The tension spring 304 may be connected to first section 302A and the second section 302B, to thereby allow the first section 302A and the second section 302B to be offset from each other. It may be understood that the offsetting between first section 302A and the second section 302B may result in response to the planar misalignment of the four points of contact (i.e., the wheels 210A, 210B, 210C, and 210D), between guide tracks 106A, 106B and the track-wheel based device 300B. Further, as a result of the first section 302A and the second section 302B offsetting from each other, the tension spring 304 may be stretched. In response to the stretch, the spring force of the tension spring 304 may provide the torsional resistance property, to thereby control the relative angular rotation between the first lateral member 204A and the second lateral member 204B.

Figure 3C:
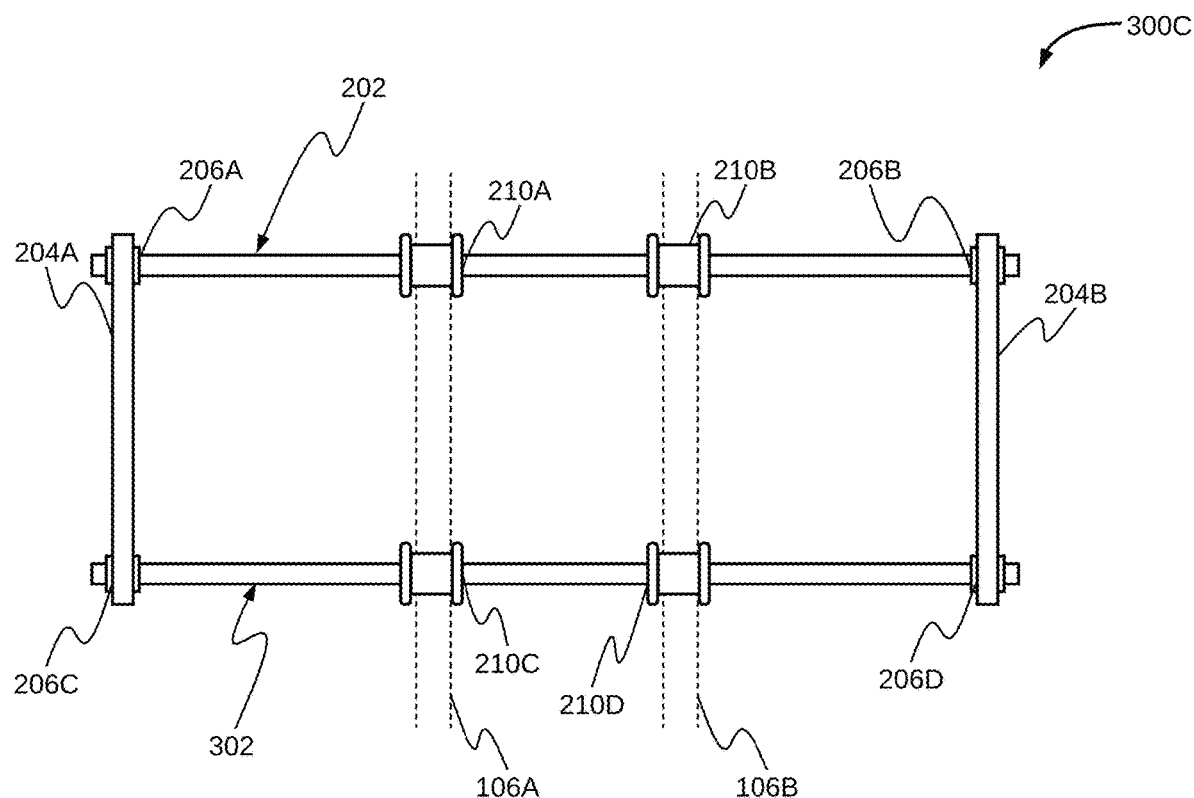
FIG. 3C illustrates a top view of the track-wheel based device including the secondary longitudinal member, in accordance with another embodiment of the disclosure.

In some embodiments, as shown in FIG. 3C, the secondary longitudinal member 302 may be coupled to the first lateral member 204A via a third coupler 206C and to the second lateral member 204B via a fourth coupler 206D. At least one of the third coupler 206C and the fourth coupler 206D may be configured to allow a rotational movement of the secondary longitudinal member 302 relative to one of the first lateral member 204A and the second lateral member 204B. For example, the secondary longitudinal member 302 may be rigidly coupled to the first lateral member 204A and the second lateral member 204B. As such, third coupler 206C and the fourth coupler 206D may be a welded joint.

Referring now to FIG. 3C, a top view of a track-wheel based device 300C (corresponding to the track-wheel based device 200) is illustrated, in accordance with an embodiment of the disclosure. The track-wheel based device 300C includes the longitudinal member 202, the first lateral member 204A and the second lateral member 204B. The longitudinal member 202 is coupled to the first lateral member 204A at the first location of the first lateral member 204A and to the second lateral member 204B at the first location of the second lateral member 204B. The track-wheel based device 300C further includes the first wheel 210A and the second wheel 2108. For example, as shown in the FIG. 3C, the first wheel 210A and the second wheel 210B may be coupled to the longitudinal member 202, such that the first wheel 210A and the second wheel 210B may rotate about the longitudinal member 202.

The track-wheel based device 300C may further include the secondary longitudinal member 302 coupled to the first lateral member 204A at the second location of the first lateral member 204A and to the second lateral member 204B at the second location of the second lateral member 204B. Further, the track-wheel based device 300C includes the third wheel 210C and the fourth wheel 210D. For example, the third wheel 210C and the fourth wheel 210D may be coupled to the secondary longitudinal member 302, such that the third wheel 210C and the fourth wheel 210D may rotate about the secondary longitudinal member 302. The first lateral member 204A and the second lateral member 204B may be configured to undergo a relative angular rotation, in response to a planar misalignment of four points of contact between guide tracks 106A, 106B.

To this end, in some embodiments, as shown in the FIG. 3C, the secondary longitudinal member 302 may be coupled to the first lateral member 204A via the third coupler 206C and to the second lateral member 204B via the fourth coupler 206D. As mentioned above, at least one of the third coupler 206C and the fourth coupler 206D may be configured to allow a rotational movement of the secondary longitudinal member 302 relative to one of the first lateral member 204A and the second lateral member 204B. To this end, at least one of the third coupler 206C and the fourth coupler 206D may be a bearing. In other words, the secondary longitudinal member 302 may be coupled to each of the first lateral member 204A and to the second lateral member 204B via a third bearing 206C and a second bearing 206D, respectively. For example, each of the third bearing 206C and the fourth bearing 206D may be a roller bearing.

It may be note that in order for the first lateral member 204A and the second lateral member 204B to undergo the relative angular rotation, the secondary longitudinal member 302 should be able to undergo axial linear movement relative to the first lateral member 204A (via the third coupler 206C) or the second lateral member 204B (via the fourth coupler 206D). In other words, the secondary longitudinal member 302 should be able to slide in and slide out relative to at least the first lateral member 204A and/or the second lateral member 204B to allow the track-wheel based device 300C to assume the twisted configuration.

To this end, in some embodiments, the secondary longitudinal member 302 may be configured to undergo axial linear movement relative to at least one of the first lateral member 204A via the third coupler 206C and the second lateral member 204B via the fourth coupler 206D. For example, the secondary longitudinal member 302 may be coupled to the first lateral member 204A and to the second lateral member 204B via the third bearing 206C and the fourth bearing 206D, respectively, such that the bearings 206C, 206D are loose enough to allow the axial linear movement of the secondary longitudinal member 302 through the third bearing 206C and the fourth bearing 206D.

Figure 3D:
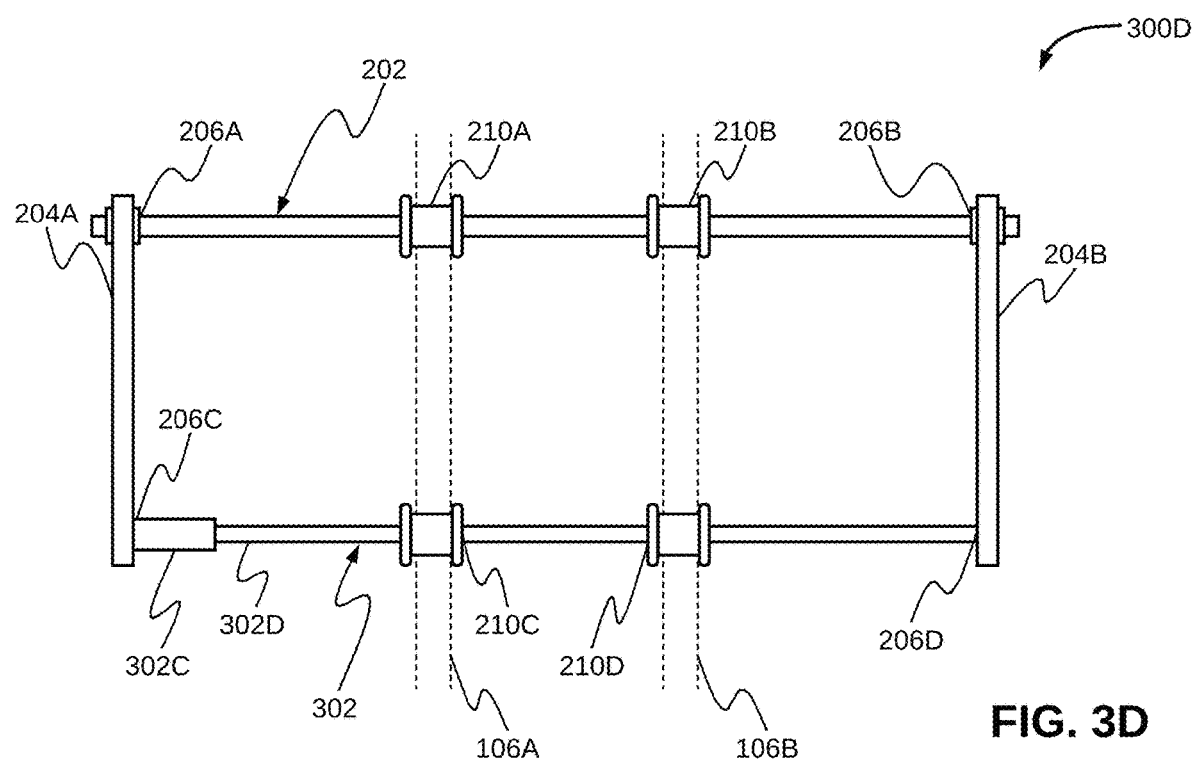
FIG. 3D illustrates a top view of the track-wheel based device with the secondary longitudinal member including a first telescopic member and a second telescopic member, in accordance with another embodiment of the disclosure.

In a yet another embodiment, the secondary longitudinal member 302 may include a telescopic assembly of first telescopic member 302C and a second telescopic member 302D, as shown in FIG. 3D. FIG. 3D shows a top view of a track-wheel based device 300D (corresponding to the track-wheel based device 200), in accordance with an embodiment. The second telescopic member 302D may be configured to slide within the first telescopic member 302C. Further, the second telescopic member 302D may be configured to rotate within the first telescopic member 302C. The first telescopic member 302C may be coupled to the first lateral member 204A at the second location of the first lateral member 204A via the third coupler 206C. Furthermore, the second telescopic member 302D may be coupled to the second lateral member 204B at the second location of the second lateral member 204B via the fourth coupler 206D.

As mentioned above, in order for the first lateral member 204A and the second lateral member 204B to undergo the relative angular rotation, the secondary longitudinal member 302 should be able to undergo axial linear movement and rotation movement relative to the first lateral member 204A (via the third coupler 206C) or the second lateral member 204B (via the fourth coupler 206D). This relative axial linear movement and rotation movement, therefore, may be achieved by way of the second telescopic member 302D sliding and rotating within the first telescopic member 302C.

Figure 3E:
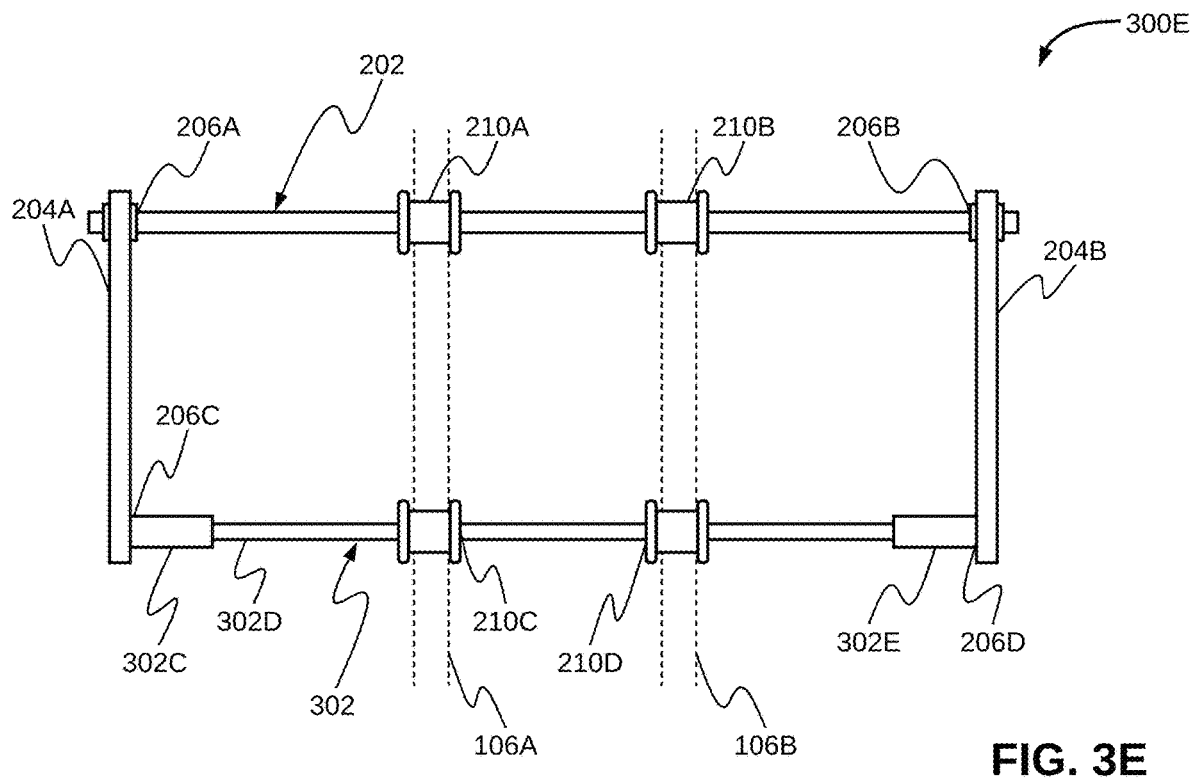
FIGS. 3E-3F illustrates a top view of the track-wheel based device with the longitudinal member and the secondary longitudinal member including telescopic members, respectively, in accordance with alternative embodiments of the disclosure.

It should be noted that, in some embodiments, the telescopic assemblies (i.e., the first telescopic member 302C and the second telescopic member 302D) may be provided on each side of the longitudinal member and near an end portion of the longitudinal member (i.e., where it joins with the lateral member). Referring now to FIG. 3E, a top view of a track-wheel based device 300E (corresponding to the track-wheel based device 200) is illustrated, in accordance with an embodiment. As explained in conjunction with FIG. 3D, the longitudinal member 202 or the secondary longitudinal member 302 may include the telescopic members on each end portion of the longitudinal member 202 or the secondary longitudinal member 302. For example, as shown in FIG. 3E, the secondary longitudinal member 302 may include the first telescopic member 302C (on left end portion of the secondary longitudinal member 302), the second telescopic member 302D, and a third telescopic member 302E (on right end portion of the secondary longitudinal member 302). The second telescopic member 302D may be configured to slide and rotate within the first telescopic member 302C and the third telescopic member 302E. Further, the secondary longitudinal member 302 may include the first telescopic member 302C and the second telescopic member 302D on a central or a middle portion of the longitudinal member 302, such that the middle portion falls within the guide tracks of tracker bridge. Alternately, the first telescopic member 302C and the third telescopic member 302E may be configured to slide and rotate within the second telescopic member 302D.

Figure 3F:
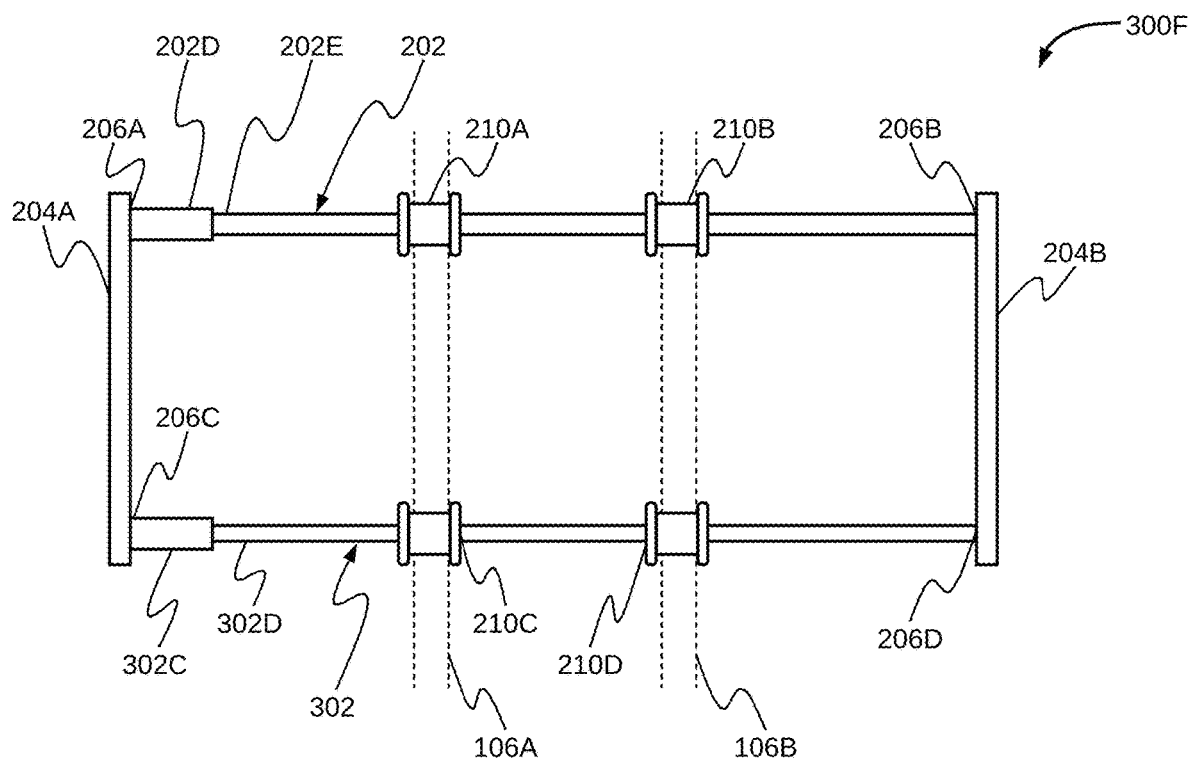

Referring now to FIG. 3F, a top view of a track-wheel based device 300F (corresponding to the track-wheel based device 200) is illustrated, in accordance with an embodiment. As explained in conjunction with FIG. 3D, the secondary longitudinal member 302 may include the first telescopic member 302C and the second telescopic member 302D. Further, in this embodiment, the longitudinal member 202 may include a first telescopic member 202D and a second telescopic member 202E. The second telescopic member 202E may be configured to slide and rotate within the first telescopic member 202D. The first telescopic member 202D may be coupled to the first lateral member 204A via the first coupler 206A, and the second telescopic member 202E may be coupled to the second lateral member 204B via the second coupler 206B.

Figure 4A:
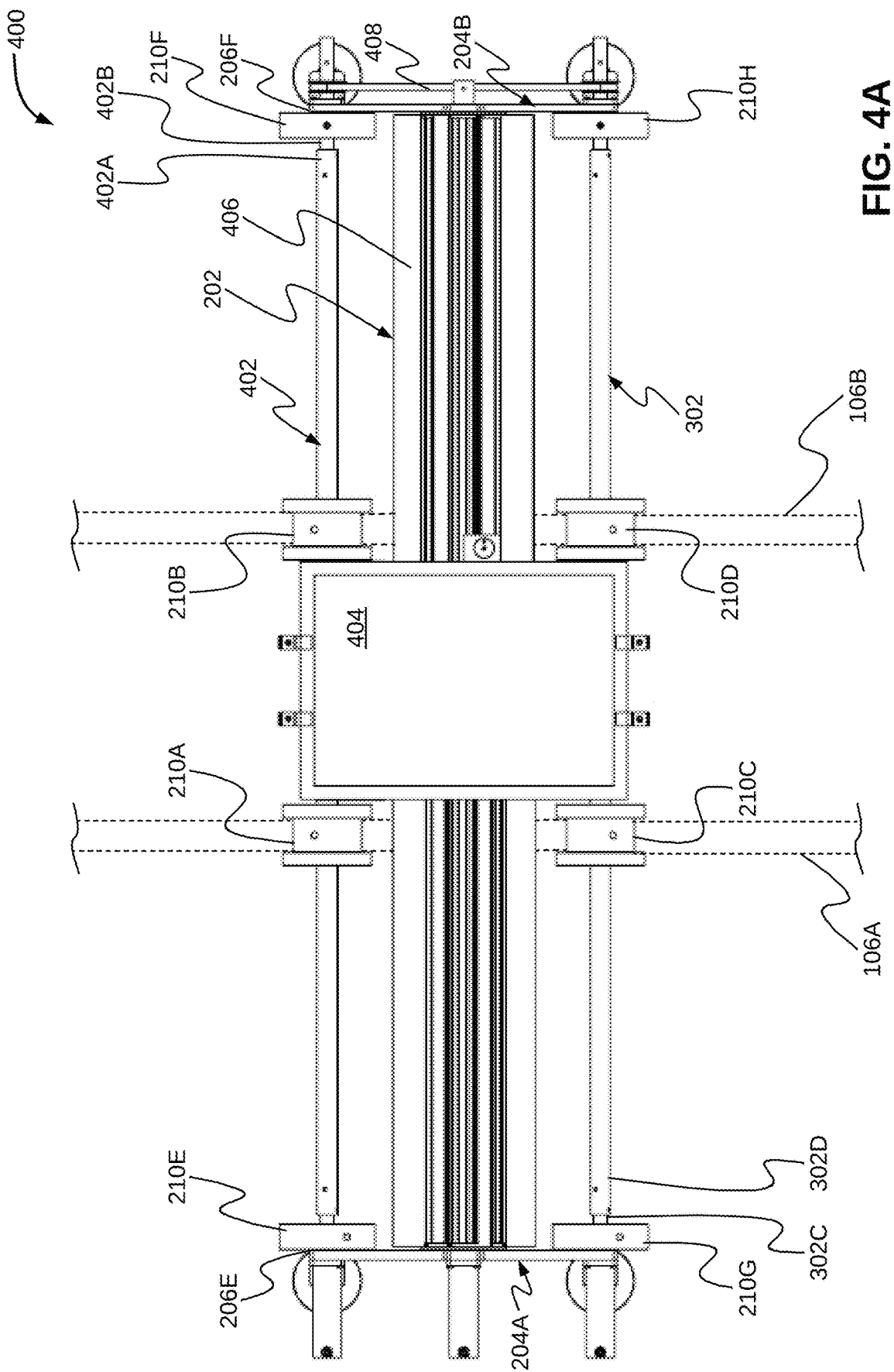
FIGS. 4A-4B illustrate a top view and a perspective view, respectively, of a track-wheel based device (with a platform) including a secondary longitudinal member and an additional secondary longitudinal member, in accordance with another embodiment of the disclosure.
Figure 4B:
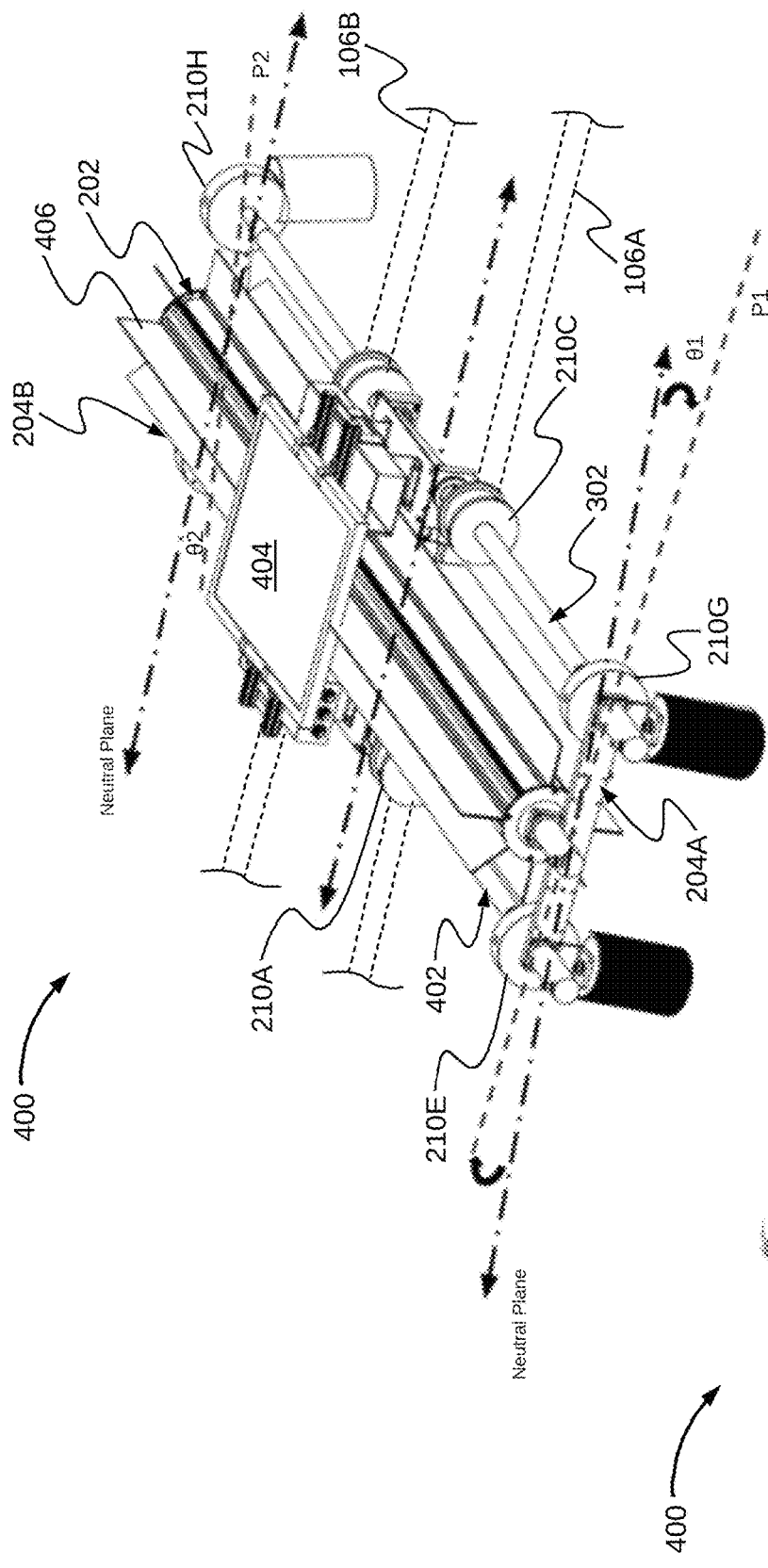
Figure 4C:
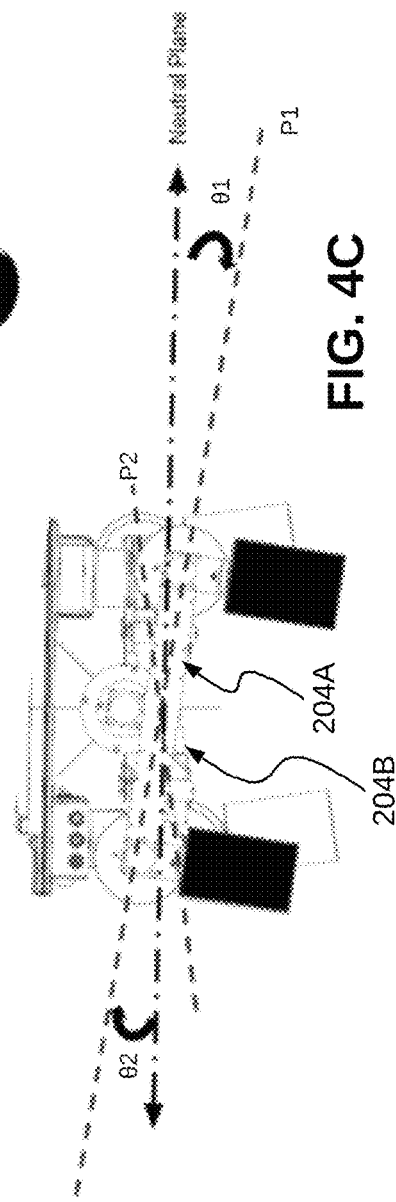
FIG. 4C illustrates a side view of the track-wheel based device including a secondary longitudinal member and an additional secondary longitudinal member in a twisted configuration, in accordance with another embodiment of the disclosure.
Figure 4D:
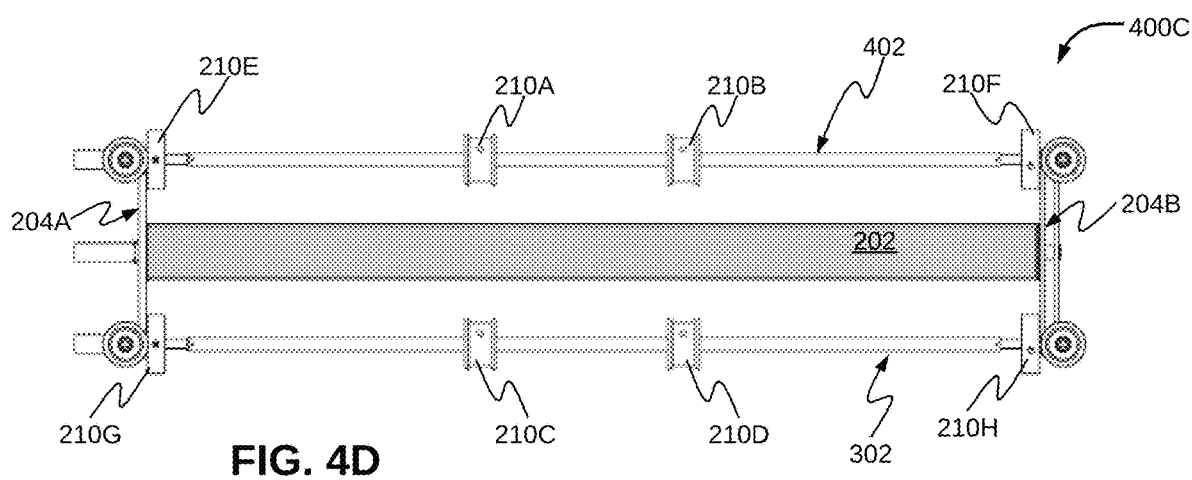
FIGS. 4D-4E illustrate a top view and a perspective view, respectively, of a track-wheel based device (without a platform) including a secondary longitudinal member and an additional secondary longitudinal member, in accordance with another embodiment of the disclosure.
Figure 4E:
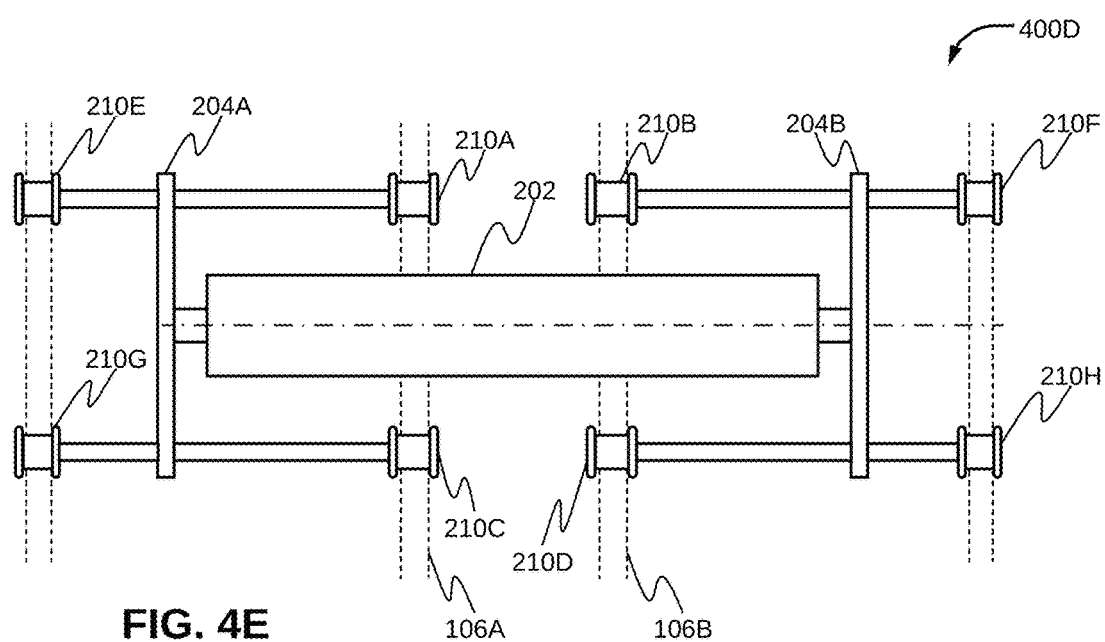

Referring now to FIGS. 4A-4B, a top view, a perspective view, and a side view, respectively, of the track-wheel based device 400 (corresponding to the track-wheel based device 200) are illustrated, in accordance with some embodiments of the present disclosure. As shown in FIGS. 4A-4B, the track-wheel based device 400 may include a platform 404 for supporting an ancillary device, like an electronic motor. FIG. 4D illustrates a top view of a track-wheel based device 400C (without the platform 404), in accordance with some embodiments of the present disclosure. FIG. 4E illustrates a top view of a track-wheel based device 400D (corresponding to track-wheel based device 400, without the platform 404), in accordance with another embodiment of the present disclosure.

In some embodiments, the track-wheel based device 400 may include two or more secondary longitudinal members, for example, the secondary longitudinal member 302 and an additional secondary longitudinal member 402. Each of the secondary longitudinal member 302 and the additional secondary longitudinal member 402 may be coupled to the first lateral member 204A at an associated location of the first lateral member 204A via an associated coupler and to the second lateral member 204B at an associated location of the second lateral member via an associated coupler. In other words, the secondary longitudinal member may be coupled to the first lateral member at the second location of the first lateral member and to the second lateral member at a second location of the second lateral member. The additional secondary longitudinal member may be coupled to the first lateral member at a third location of the first lateral member and to the second lateral member at a third location of the second lateral member.

As it will be understood, the secondary longitudinal member 302 and the additional secondary longitudinal member 402 may be configured to undergo a change in length in response to the relative angular rotation between the first lateral member 204A and the second lateral member 204B. For example, in some embodiments, each of the secondary longitudinal member 302 and the additional secondary longitudinal member 402 may be rigidly coupled to the first lateral member 204A and to the second lateral member 204B. In such embodiments, therefore, each of the secondary longitudinal member 302 and the additional secondary longitudinal member 402 may be able to expand or contract in length in response to the relative angular rotation between the first lateral member 204A and the second lateral member 204B, so as to allow the track-wheel based device 400 to assume the twisted configuration. For example, FIG. 4C shows a side view of the track-wheel based device 400 in a twisted configuration, i.e., with the first lateral member 204A and the second lateral member 204B having undergone a relative angular rotation. Further, each of the secondary longitudinal member 302 and the additional secondary longitudinal member 402 may be able to rotate to some degrees relative to the first lateral member 204A and the second lateral member 204B, in response to the relative angular rotation between the first lateral member 204A and the second lateral member 204B. In other words, the secondary longitudinal member 302 and the additional secondary longitudinal member 402 may have tension and torsional flexibility. As such, the secondary longitudinal member 302 and the additional secondary longitudinal member 402 may be made of material having sufficient elasticity to allow the change in length and rotation/twist, for example, a material selected from rubber, steel, etc. In another example, the secondary longitudinal member 302 and/or the additional secondary longitudinal member 402 may be made of a spring, like a helical spring.

By way of an example, as shown in FIGS. 4B-4C, due to convoluted misalignment of the guide tracks 106A, 106B, the track-wheel based device may assume the twisted configuration. In this twisted configuration, a plane P1 of the first lateral member 204A may rotate by an angle 81 with respect to a neutral plane (neutral plane being the plane of the first lateral member 204A and the second lateral member 204B, when the track-wheel based device is in untwisted configuration). Similarly, a plane P2 of the second lateral member 204B may rotate by an angle 82 with respect to the neutral plane. For example, each of the angle 81 and the angle 82 may be 5 degrees. It may be noted that, as a result of the plane P1 rotating by the angle 81 and the plane P2 rotating by the angle 82 with respect to the neutral plane, the track-wheel based device 400 may be able to establish four points of contact between with the guide tracks 106A, 106B, despite the convoluted misalignment of the guide tracks 106A, 106B.

Further, in some embodiments, the secondary longitudinal member 302 and the additional secondary longitudinal member 402 may have torsional resistance property. In alternate embodiments, the secondary longitudinal member 302 and/or the additional secondary longitudinal member 402 may include a tension spring 304 having tension and torsional flexibility.

In some embodiments, the secondary longitudinal member 302 may be coupled to the first lateral member 204A via the third coupler 206C and to the second lateral member 204B via the fourth coupler 206D. Further, the additional secondary longitudinal member 402 may be coupled to the first lateral member 204A via a fifth coupler 206E and to the second lateral member 204B via a sixth coupler 206F. At least one of the third coupler 206C and the fourth coupler 206D may be configured to allow a rotational movement of the secondary longitudinal member 302 relative to one of the first lateral member 204A and the second lateral member 204B. Similarly, at least one of the fifth coupler 206E and the sixth coupler 206F may be configured to allow a rotational movement of the additional secondary longitudinal member 402 relative to one of the first lateral member 204A and the second lateral member 204B.

In some embodiments, as shown in FIG. 4A-4B, the track-wheel based device 400 may further include the wheel 210A, the wheel 210B, a wheel 210E, and a wheel 210F. For example, the wheels 210A, 210B, 210E, and 210F may be coupled to the secondary longitudinal member 302, such that the wheels 210A, 210B, 210E, and 210F may rotate about the secondary longitudinal member 302. The track-wheel based device 400 may further the wheel 210C, the wheel 210D, a wheel 210G, and a wheel 210H. For example, the wheels 210C, 210D, 210G, and 210H may be coupled to the additional secondary longitudinal member 402, such that the wheels 210C, 210D, 210G, and 210H may rotate about the additional secondary longitudinal member 402.

It may be noted that, in some embodiments, in scenarios when the track-wheel based device 400 is travelling on a solar panel, the wheels 210E, 210F, 210G, and 210H, i.e., the wheels on the outer side of the track-wheel based device 400 may establish points of contacts with the surface of the solar panel to, therefore, enable the track-wheel based device 400 to travel on the solar panel. However, in such scenarios, the wheels 210A, 210B, 210C, and 210D, i.e., the wheels on the inner side of the track-wheel based device 400 may not contact and establish points of contact with the surface of the solar panel. Further, in scenarios when the track-wheel based device 400 is travelling on the guide tracks 106A, 106B, the wheels 210A, 210B, 210C, and 210D may establish points of contacts with the guide tracks 106A, 106B to, therefore, enable the track-wheel based device 400 to travel on the guide tracks 106A, 106N. In these scenarios, the wheels 210E, 210F, 210G, and 210H may not establish points of contacts with the surface of the solar panel of the guide tracks 106A, 106B.

As mentioned earlier, in the scenarios when the track-wheel based device 400 is travelling on the guide tracks 106A, 106B, in response to a planar misalignment of four points of contact between the guide tracks 106A, 106B, the first lateral member 204A and the second lateral member 204B may undergo a relative angular rotation.

To this end, in some embodiments, the secondary longitudinal member 302 may be coupled to the first lateral member 204A via the third coupler 206C and to the second lateral member 204B via the fourth coupler 206D. As mentioned above, at least one of the third coupler 206C and the fourth coupler 206D may be configured to allow a rotational movement of the secondary longitudinal member 302 relative to one of the first lateral member 204A and the second lateral member 204B. For example, at least one of the third coupler 206C and the fourth coupler 206D may be a bearing.

Similarly, the additional secondary longitudinal member 402 may be coupled to the first lateral member 204A via the fifth coupler 206E and to the second lateral member 204B via the sixth coupler 206F. At least one of the fifth coupler 206E and the sixth coupler 206F may be configured to allow a rotational movement of the additional secondary longitudinal member 402 relative to one of the first lateral member 204A and the second lateral member 204B. At least one of the fifth coupler 206E and the sixth coupler 206F may be a bearing.

In order for the first lateral member 204A and the second lateral member 204B to undergo the relative angular rotation, the secondary longitudinal member 302 and the additional secondary longitudinal member 402 should be able to undergo axial linear movement relative to the first lateral member 204A or the second lateral member 204B. In other words, the secondary longitudinal member 302 and the additional secondary longitudinal member 402 should be able to slide in and slide out relative to at least the first lateral member 204A or the second lateral member 204B to allow the track-wheel based device 400 to assume the twisted configuration. To this end, for example, the third coupler 206C and the fourth coupler 206D may be a bearing loose enough to allow the axial linear movement of the secondary longitudinal member 302 through them. Similarly, the fifth coupler 206E and the sixth coupler 206F may be a bearing loose enough to allow the axial linear movement of the additional secondary longitudinal member 402 through them.

In yet another embodiment, the secondary longitudinal member 302 may include the first telescopic member 302C and a second telescopic member 302D, such that the second telescopic member 302D is configured to slide and rotate within the first telescopic member 302C. Similarly, the additional secondary longitudinal member 402 may include a first telescopic member 402A and a second telescopic member 402B, such that the second telescopic member 402B is configured to slide and rotate within the first telescopic member 402A.

As it will be understood, the relative angular rotation between the first lateral member 204A and the second lateral member 204B, may subject the longitudinal member 202 to a compression force and subject the secondary longitudinal member 302 and the additional secondary longitudinal member 402 to a tension force. To this end, the longitudinal member 202 may have ability to withstand the axial compression. Similarly, the secondary longitudinal member 302 and the additional secondary longitudinal member 402 may have ability to withstand axial tension. Further, in some embodiments, in order for the first lateral member 204A and the second lateral member 204B to undergo a relative angular rotation, the longitudinal member 202 may have axial compression flexibility. Further, the secondary longitudinal member 302 and the additional secondary longitudinal member 402 may have axial compression flexibility. Alternately or additionally, the longitudinal member 202 may include an axial compression flexible member, for example, a spring. Further, the secondary longitudinal member 302 and the additional secondary longitudinal member 402 may also include an axial tension flexible member.

As shown in FIG. 4A-4B, in some embodiments, the track-wheel based device 400 may include a brush member 406, for example, for cleaning the solar panels 104A, 104B. For example, the brush member 406 may be coupled to the longitudinal member 202, such that the brush member 406 may along with the longitudinal member 202. To this end, the track-wheel based device 400 may include a primary rotation source (not shown in FIG. 4A-4B) to impart rotatory motion to the longitudinal member 202. For example, the primary rotation source may be an electric motor.

In some embodiments, this primary rotation source may further impart rotatory motion to one or more wheels of the wheels 210A, 210B, 210C, 210D, 210E, 210F, 210G, and 210H to cause a movement of the track-wheel based device 400 on the guide tracks 106A,106B. To this end, in some embodiments, the primary rotation source may be simultaneously coupled to the secondary longitudinal member 302 and may impart rotatory motion to the secondary longitudinal member 302. As such, the primary rotation source may cause to rotate the wheels 210A, 210B, 210E, and 210F coupled to the secondary longitudinal member 302. Further, in some embodiments, the additional secondary longitudinal member 402 may be coupled to the secondary longitudinal member 302 via a coupling 408. For example, the coupling 408 may be a belt drive or a chain drive. Therefore, the secondary longitudinal member 302 may cause to rotate the additional secondary longitudinal member 402, and thereby rotate the wheels 210C, 210D, 210G, and 210H coupled to the additional secondary longitudinal member 402, to thereby cause movement of the track-wheel based device 400 on the guide tracks 106A,106B.

In alternate embodiments, the track-wheel based device 400 may include a secondary rotation source (not shown in FIG. 4). The secondary rotation source may impart rotatory motion to the secondary longitudinal member 302, and then to the additional secondary longitudinal member 402.

Figure 5:
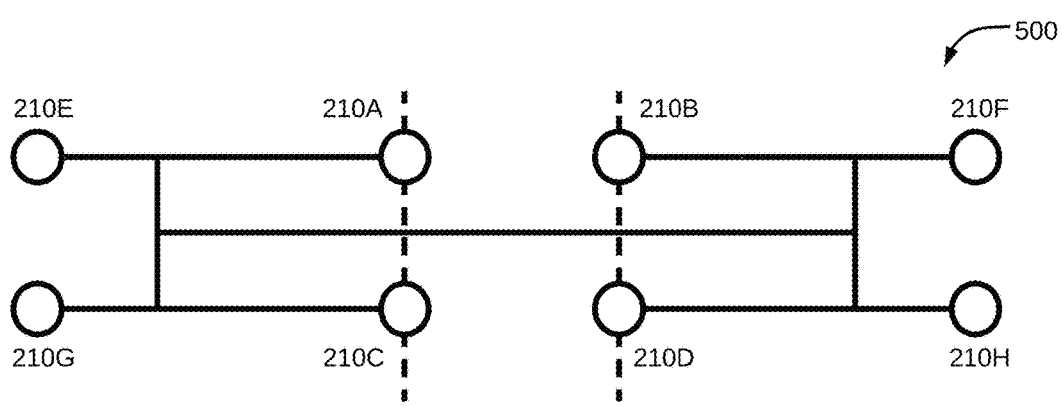
FIG. 5 illustrates a schematic top view of a track-wheel based device including a secondary longitudinal member and an additional secondary longitudinal member, in accordance with another embodiment of the disclosure.

FIG. 5 illustrates a schematic diagram of a track-wheel based device 500 (corresponding to the track-wheel based devices 400, 400C, 400D), in accordance with some embodiments of the present disclosure. The track-wheel based device 500 includes wheels 210A, 210B, 210C, and 210D positioned towards the inner side of the track-wheel based device 500, and wheels 210E, 210F, 210G, and 210H positioned towards the outer side of the track-wheel based device 500. Further, the wheels 210A, 210B, 210C, and 210D may be configured to run on the track guides 106A, 106B when the track-wheel based device 500 is transitioning from one solar panel to another, and the wheels 210E, 210F, 210G, and 210H may be configured to run on the solar panel when the track-wheel based device 500 is travelling on the solar panel.

Figure 6:
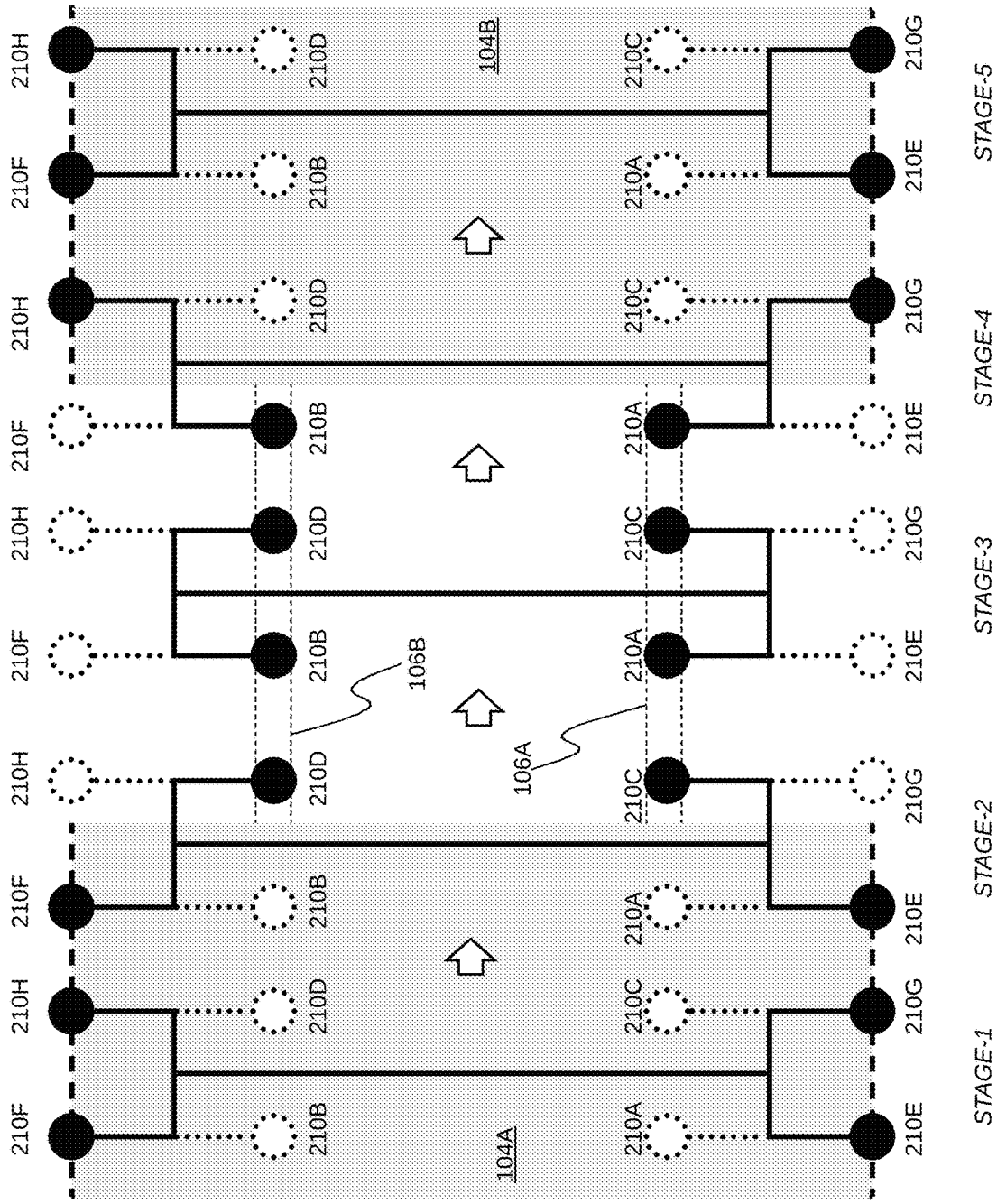
FIG. 6 is a process flow diagram of transition of the track-wheel based device from across solar panels, in accordance with an embodiment of the present disclosure.

FIG. 6 illustrates a process flow 600 of transition of the track-wheel based device 500 from the first solar panel 104A to the second solar panel 104B, in accordance with an embodiment of the present disclosure. For example, in stage-1, the track-wheel based device 500 may be positioned and travelling above the first solar panel 104A. The wheels 210A, 210B, 210C, and 210D (inner wheels), and the wheels 210E, 210F, 210G, and 210H (outer wheels) may be positioned above the surface of the first solar panel 104A. As mentioned earlier, in scenarios when the track-wheel based device 500 is travelling on a solar panel, the wheels 210E, 210F, 210G, and 210H (outer wheels), i.e., the wheels on the outer side of the track-wheel based device 200 may establish points of contacts with the surface of the solar panel to, therefore, enable the track-wheel based device 500 to travel on a solar panel. However, in such scenarios, the wheels 210A, 210B, 210C, and 210D (inner wheels) may not establish points of contacts with the surface of the solar panel. Therefore, in stage-1, the outer wheels 210E, 210F, 210G, and 210H (represented by solid circles) may establish points of contact with the surface of the solar panel 104A, and the inner wheels 210A, 210B, 210C, and 210D (represented by hollow, dotted circles) may not establish points of contacts with the surface of the solar panel. The track-wheel based device 500 may be in original/untwisted orientation.

In stage-2, the track-wheel based device 500 may be in a transition position between the first solar panel 104A and the second solar panel 104B. The wheels 210A, 210B, 210E, and 210F may be positioned above the surface of the first solar panel 104A, and the wheels 210C, 210D, 210G, and 210H may be positioned in the region between the first solar panel 104A and the second solar panel 104B (i.e., in the region of guide tracks 106A, 106B). As mentioned earlier, in scenarios when the track-wheel based device 500 is travelling on a solar panel, the outer wheels 210E and 210F may establish points of contacts with the surface of the solar panel. Further, the outer wheels 210C and 210D may establish points of contacts with the guide tracks 106A, 106B. However, it may be noted that, due to convoluted misalignment of the guide tracks 106A, 106B, each of these outer wheels 210C and 210D may not be able to establish points of contacts with the guide tracks 106A, 106B, and only one of the wheels 210C and 210D may be able to establish points of contacts with the guide tracks 106A, 106B. As such, the first lateral member 204A and the second lateral member 204B may undergo a relative angular rotation (i.e., the track-wheel based device 500 may assume a twisted configuration), in order for the wheels 210C and 210D to establish points of contact with the guide tracks 106A, 106B.

In stage-3, the track-wheel based device 500 may be positioned on the guide tracks 106A, 106B, such that the inner wheels 210A, 210B, 210C and 210D may be located in the region of the guide tracks 106A, 106B, and may establish points of contact with the guide tracks 106A, 106B, when the guide tracks 106A, 106B are aligned to each other. Further, as it will be understood, in stage-3, the outer wheels 210E, 210F, 210G, and 210H may not establish be positioned with first solar panel 104A or the second solar panel 104B. Due to convoluted misalignment of the guide tracks 106A, 106B, each of the inner wheels 210A, 210B, 210C, and 210D may not be able to establish points of contacts with the guide tracks 106A, 106B, and only one, or two, or three wheels of the 210A, 210B, 210C, and 210D may be able to establish points of contacts with the guide tracks 106A, 106B. As such, the first lateral member 204A and the second lateral member 204B may undergo a relative angular rotation (i.e., the track-wheel based device 500 may assume a twisted configuration), in order for all the wheels 210A, 210B, 210C, and 210D to establish points of contacts with the guide tracks 106A, 106B.

In stage-4, the track-wheel based device 500 may once again be in a transition position with the wheels 210C, 210D, 210G, and 210H positioned above the surface of the first solar panel 104A, and the wheels 210A, 210B, 210E, and 210F positioned in the region between the first solar panel 104A and the second solar panel 104B (i.e., in the region of guide tracks 106A, 106B). Further, the wheels 210G and 210H may establish points of contacts with the second solar panel 104B. Furthermore, the wheels 210A and 2108 may be able to establish points of the contact with the guide tracks 106A, 106B, when the guide tracks 106A, 106B are aligned to each other. However, due to convoluted misalignment of the guide tracks 106A, 106B, each of the wheels 210A and 210B may not be able to establish points of contacts with the guide tracks 106A, 106B, and at most only one of the wheels 210A and 210B may be able to establish points of contacts with the guide tracks 106A, 106B. As such, the first lateral member 204A and the second lateral member 204B may undergo a relative angular rotation, in order for the wheels 210A and 2108 to establish points of contacts with the guide tracks 106A, 106B.

In stage-5, the track-wheel based device 500 may be positioned and travelling on the second solar panel 104B. In other words, the wheels 210A, 210B, 210C, and 210D (inner wheels), and the wheels 210E, 210F, 210G, and 210H (outer wheels) may be positioned above the surface of the first solar panel 104A. Further, the wheels 210E, 210F, 210G, and 210H (outer wheels), i.e., the wheels on the outer side of the track-wheel based device 500 may establish points of contacts with the surface of the solar panel. Furthermore, the wheels 210A, 210B, 210C, and 210D (inner wheels) may not establish points of contacts with the surface of the solar panel.

The above disclosure describes one or more flexible track-wheel based devices that are capable of travelling one guide tracks bridging panels, such as solar panels. The above one or more flexible track-wheel based devices provide a simple, cost-effective, and yet an effective solution to misalignment/convoluted alignment of the guide tracks. As such, the above one or more flexible track-wheel based devices are able to overcome misalignment/convoluted alignment of the guide tracks and ensure that points of contact of all the wheels are maintained with the guide tracks. The one or more flexible track-wheel based devices, owing to their flexibility, are able to assume twisted configuration on misaligned guide tracks. This avoids the risk of falling off the guide tracks, and ensures that the transition of the track-wheel based device from the guide tracks to the solar panel table is smooth. Further, track-wheel based device is able to avoid getting stuck at the junction of the guide tracks and the solar panel tables.

It is intended that the disclosure and examples be considered as exemplary only, with a true scope and spirit of disclosed embodiments being indicated by the following claims.

What is claimed is:

1. A track-wheel based device, comprising:
   a longitudinal member substantially perpendicular to an axis (A1) of motion of the track-wheel based device;
   a secondary longitudinal member; and
   a first lateral member and a second lateral member, each being substantially parallel to the axis (A1) of motion of the track-wheel based device, wherein:
      the longitudinal member is coupled to the first lateral member at a first location of the first lateral member and to the second lateral member at a first location of the second lateral member,
      the secondary longitudinal member is coupled to the first lateral member at a second location of the first lateral member and to the second lateral member at a second location of the second lateral member, and
      the first lateral member and the second lateral member are configured to undergo a relative angular rotation, in response to a planar misalignment of four or more points of contact between two or more guide tracks for the track-wheel based device and the track-wheel based device.

2. The track-wheel based device of claim 1, wherein the first lateral member and the second lateral member are configured to undergo a relative angular rotation about a torsional-axis (A2) substantially perpendicular to the axis (A1) of motion of the track-wheel based device.

3. The track-wheel based device of claim 1, wherein:
   the longitudinal member is rigidly coupled to the first lateral member and to the second lateral member, and
   the longitudinal member is torsionally flexible.

4. The track-wheel based device of claim 1, wherein the longitudinal member is coupled to the first lateral member via a first coupler and to the second lateral member via a second coupler, and wherein at least one of the first coupler and the second coupler is configured to allow a rotational movement of the longitudinal member relative to one of the first lateral member and the second lateral member.

5. The track-wheel based device of claim 1, further comprising at least one torsional spring to control the relative angular rotation.

6. The track-wheel based device of claim 5, wherein the longitudinal member is coupled to the first lateral member via a first coupler and to the second lateral member via a second coupler, and wherein at least one of the first coupler and the second coupler comprises the torsional spring.

7. The track-wheel based device of claim 1, further comprising at least one rotational actuator, wherein the at least one rotational actuator is configured to cause the relative angular rotation.

8. The track-wheel based device of claim 7, wherein the at least one rotational actuator is configured to rotate at least one of the first lateral member and the second lateral member relative to the longitudinal member to cause the relative angular rotation.

9. The track-wheel based device of claim 1, further comprising at least one rotation limiter to limit the relative angular rotation.

10. The track-wheel based device of claim 9, wherein the longitudinal member is coupled to the first lateral member via a first coupler and to the second lateral member via a second coupler, and wherein at least one of the first coupler and the second coupler comprises the rotation limiter.

11. The track-wheel based device of claim 1, wherein the secondary longitudinal member has torsional resistance property to control the relative angular rotation.

12. The track-wheel based device of claim 1, wherein the secondary longitudinal member comprises a tension spring to control the relative angular rotation.

13. The track-wheel based device of claim 1, wherein the secondary longitudinal member is coupled to the first lateral member via a third coupler and to the second lateral member via a fourth coupler, and wherein at least one of the third coupler and the fourth coupler is configured to allow a rotational movement of the secondary longitudinal member relative to one of the first lateral member and the second lateral member.

14. The track-wheel based device of claim 1, wherein the secondary longitudinal member is configured to undergo axial linear movement relative to at least one of the first lateral member via the third coupler and the second lateral member via the fourth coupler.

15. The track-wheel based device of claim 1, wherein the secondary longitudinal member is configured to undergo a change in length in response to the relative angular rotation between the first lateral member and the second lateral member.

16. The track-wheel based device of claim 15, wherein the secondary longitudinal member comprises:
   a first telescopic member; and
   a second telescopic member configured to slide within the first telescopic member, wherein:
      the first telescopic member is coupled to the first lateral member at the second location of the first lateral member via the third coupler, and
      the second telescopic member is coupled to the second lateral member at the second location of the second lateral member via the fourth coupler.

17. The track-wheel based device of claim 1, wherein the secondary longitudinal member is rigidly coupled to the first lateral member and to the second lateral member.

18. The track-wheel based device of claim 17, wherein, at least one of:
   the secondary longitudinal member has tension and torsional flexibility; and
   the secondary longitudinal member comprises a member having tension and torsional flexibility.

19. The track-wheel based device of claim 1, further comprising:
   one or more additional secondary longitudinal members, each coupled to the first lateral member at an associated location of the first lateral member via an associated coupler and to the second lateral member at an associated location of the second lateral member via an associated coupler.

20. The track-wheel based device of claim 19, wherein:
the longitudinal member has axial compression flexibility, and
each of the one or more additional secondary longitudinal members has axial tension flexibility.

21. The track-wheel based device of claim 19, wherein:
the longitudinal member comprises an axial compression flexible member, and
each of the one or more additional secondary longitudinal members comprises an axial tension flexible member.

22. The track-wheel based device of claim 1, further comprising a primary rotation source to impart rotatory motion to the longitudinal member.

23. The track-wheel based device of claim 22, wherein the primary rotation source is further configured to impart rotatory motion to at least one wheel of the track-wheel based device, to cause a movement of the track-wheel based device on the two or more guide tracks.

24. The track-wheel based device of claim 22, further comprising a secondary rotation source configured to impart rotatory motion to at least one wheel of the track-wheel based device, to cause a movement of the track-wheel based device on the two or more guide tracks.

25. A track-wheel based device, comprising:
a first lateral member and a second lateral member, each being substantially parallel to an axis (A1) of motion of the track-wheel based device;
a longitudinal member substantially perpendicular to the axis (A1) of motion of the track-wheel based device, wherein the longitudinal member is coupled to the first lateral member at a first location of the first lateral member and to the second lateral member at a first location of the second lateral member,
a secondary longitudinal member substantially perpendicular to the axis (A1) of motion of the track-wheel based device, wherein the secondary longitudinal member is coupled to the first lateral member at a second location of the first lateral member and to the second lateral member at a second location of the second lateral member,
an additional secondary longitudinal member substantially perpendicular to the axis (A1) of motion of the track-wheel based device, wherein the additional secondary longitudinal member is coupled to the first lateral member at a third location of the first lateral member and to the second lateral member at a third location of the second lateral member,
wherein the first lateral member and the second lateral member are configured to undergo a relative angular rotation, in response to a planar misalignment of four or more points of contact between two or more guide tracks for the track-wheel based device and the track-wheel based device.

26. The track-wheel based device of claim 25, wherein:
the longitudinal member is coupled to the first lateral member via a first coupler and to the second lateral member via a second coupler, wherein at least one of the first coupler and the second coupler is configured to allow at least one of a rotational movement and an axial linear movement of the longitudinal member relative to one of the first lateral member and the second lateral member,
the secondary longitudinal member is coupled to the first lateral member via a third coupler and to the second lateral member via a fourth coupler, and wherein at least one of the third coupler and the fourth coupler is configured to allow at least one of a rotational movement and an axial linear movement of the secondary longitudinal member relative to one of the first lateral member and the second lateral member, and
the additional secondary longitudinal member is coupled to the first lateral member via a fifth coupler and to the second lateral member via a sixth coupler, and wherein at least one of the fifth coupler and the sixth coupler is configured to allow at least one of a rotational movement and an axial linear movement of the additional secondary longitudinal member relative to one of the first lateral member and the second lateral member.

27. The track-wheel based device of claim 25, wherein at least one of the longitudinal member, the secondary longitudinal member, and the additional secondary longitudinal member is configured to undergo a change in length in response to the relative angular rotation between the first lateral member and the second lateral member.

28. The track-wheel based device of claim 25, wherein at least one of the longitudinal member, the secondary longitudinal member, and the additional secondary longitudinal member comprises:
a first telescopic member; and
a second telescopic member configured to slide and rotate within the first telescopic member.

\* \* \* \* \*